United States Patent
Xia et al.

(10) Patent No.: US 12,502,451 B2
(45) Date of Patent: Dec. 23, 2025

(54) STERILIZATION INDICATOR SENSOR WITH A STERILANT-RESPONSIVE SWITCH

(71) Applicant: Solventum Intellectual Properties Company, Maplewood, MN (US)

(72) Inventors: Wensheng Xia, Woodbury, MN (US); Naiyong Jing, St. Paul, MN (US); Kara A. Meyers, Oakdale, MN (US); Ankit Mahajan, St. Paul, MN (US); Benjamin J. Münstermann, Duisburg (DE); Nicholas T. Gabriel, Woodbury, MN (US); G. Marco Bommarito, Stillwater, MN (US); Daniel J. Theis, Mahtomedi, MN (US); Roger W. Barton, Afton, MN (US); Mikhail L. Pekurovsky, Bloomington, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 865 days.

(21) Appl. No.: 17/601,966

(22) PCT Filed: Apr. 21, 2020

(86) PCT No.: PCT/IB2020/053773
§ 371 (c)(1),
(2) Date: Oct. 7, 2021

(87) PCT Pub. No.: WO2020/217173
PCT Pub. Date: Oct. 29, 2020

(65) Prior Publication Data
US 2022/0184262 A1   Jun. 16, 2022

Related U.S. Application Data

(60) Provisional application No. 62/837,979, filed on Apr. 24, 2019.

(51) Int. Cl.
*A61L 2/28* (2006.01)
*A61L 2/07* (2006.01)

(52) U.S. Cl.
CPC ............... *A61L 2/28* (2013.01); *A61L 2/07* (2013.01); *A61L 2202/14* (2013.01)

(58) Field of Classification Search
None
See application file for complete search history.

(56) References Cited

U.S. PATENT DOCUMENTS 5,745,039 A * 4/1998 Hof .................... G01K 3/04
                                                335/215
8,343,437 B2   1/2013 Patel
(Continued)

FOREIGN PATENT DOCUMENTS

CN   104056292      1/2017
WO   2014133854 A1  9/2014

OTHER PUBLICATIONS

Dzugan et al., "Sensitivity of Organic Humidity Sensor Element on Organic Vapours", Procedia Engineering 69 (2014), 962-967 (Year: 2014).*

(Continued)

*Primary Examiner* — Henry H Nguyen

(57) ABSTRACT

Aspects of the present disclosure relate to a sensor device having an integrated circuit and a monitoring loop coupled to the integrated circuit. The monitoring loop includes a first conductive trace and a second conductive trace, each having a first end electrically coupled to the integrated circuit and a second end. The monitoring loop includes a sterilant-responsive switch electrically coupling the second ends of the first conductive trace and the second conductive trace. The sterilant-responsive switch has a first impedance state and a second impedance state. The sterilant-responsive switch modifies an electrical connection between the first (Continued)

conductive trace and the second conductive trace based on exposure to an adequate environmental condition in an adequate sterilization process. The sensor device also includes an antenna coupled to the integrated circuit forming an antenna loop that is distinct from the monitoring loop.

17 Claims, 20 Drawing Sheets

(56) References Cited

U.S. PATENT DOCUMENTS

| | | | |
|---|---|---|---|
| 9,170,245 B2 | 10/2015 | Landgrebe | |
| 10,161,895 B2 | 12/2018 | Bommarito | |
| 11,079,340 B2 | 8/2021 | Bommarito | |
| 2004/0262170 A1* | 12/2004 | Centanni | G01N 27/126 205/782 |
| 2008/0061965 A1* | 3/2008 | Kuhns | G06K 19/0723 340/539.22 |
| 2008/0138889 A1 | 6/2008 | Noda | |
| 2009/0301382 A1 | 12/2009 | Patel | |
| 2011/0003279 A1 | 1/2011 | Patel | |
| 2011/0192115 A1* | 8/2011 | Gammons | A61B 50/30 53/167 |
| 2012/0116803 A1* | 5/2012 | Reid | G16H 40/20 705/2 |
| 2014/0262829 A1 | 9/2014 | Franciskovich | |
| 2015/0122017 A1* | 5/2015 | Park | G01N 21/81 73/335.01 |
| 2017/0038325 A1* | 2/2017 | Takashima | G06K 19/0702 |
| 2017/0234741 A1 | 8/2017 | Erickson | |
| 2017/0255854 A1* | 9/2017 | Bhatia | G06K 19/0717 |
| 2018/0024011 A1 | 1/2018 | Patel | |

OTHER PUBLICATIONS

Huheey JE, Keiter EA & Keiter RL 1993, Principles of Structure & Reactivity, 4th ed., HarperCollins College Publishers, ISBN 0-06-042995-X, 46 pages.

Rutala, "Guideline for Disinfection and Sterilization in Healthcare Facilities", Center for Disease Control, 2008, 7 pages.

Schmitt, "Design, Fabrication and Characterization of a Microfluidic Time-Temperature Indicator", 28th Micromechanics and Microsystems Europe Workshop, IOP Conf. Series: Journal of Physics: Conf. Series 922 (2017) 012004, pp. 1-6.

International Search Report for PCT International Application No. PCT/IB2020/053773, mailed on Sep. 10, 2020, 3 pages.

* cited by examiner

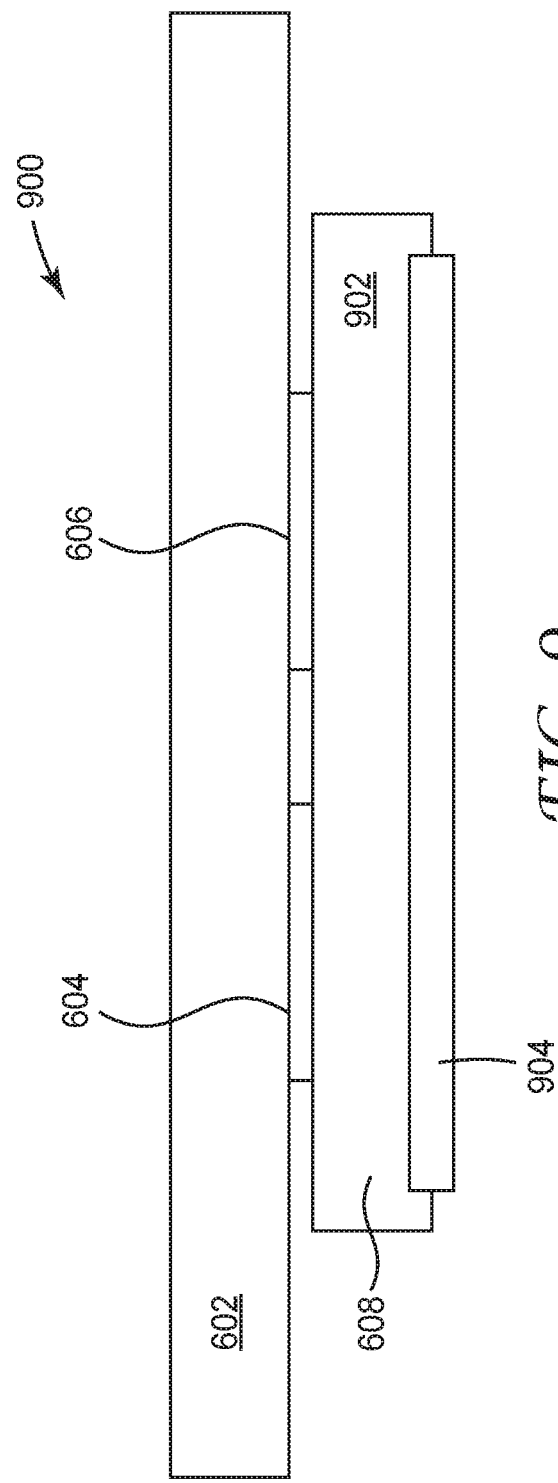

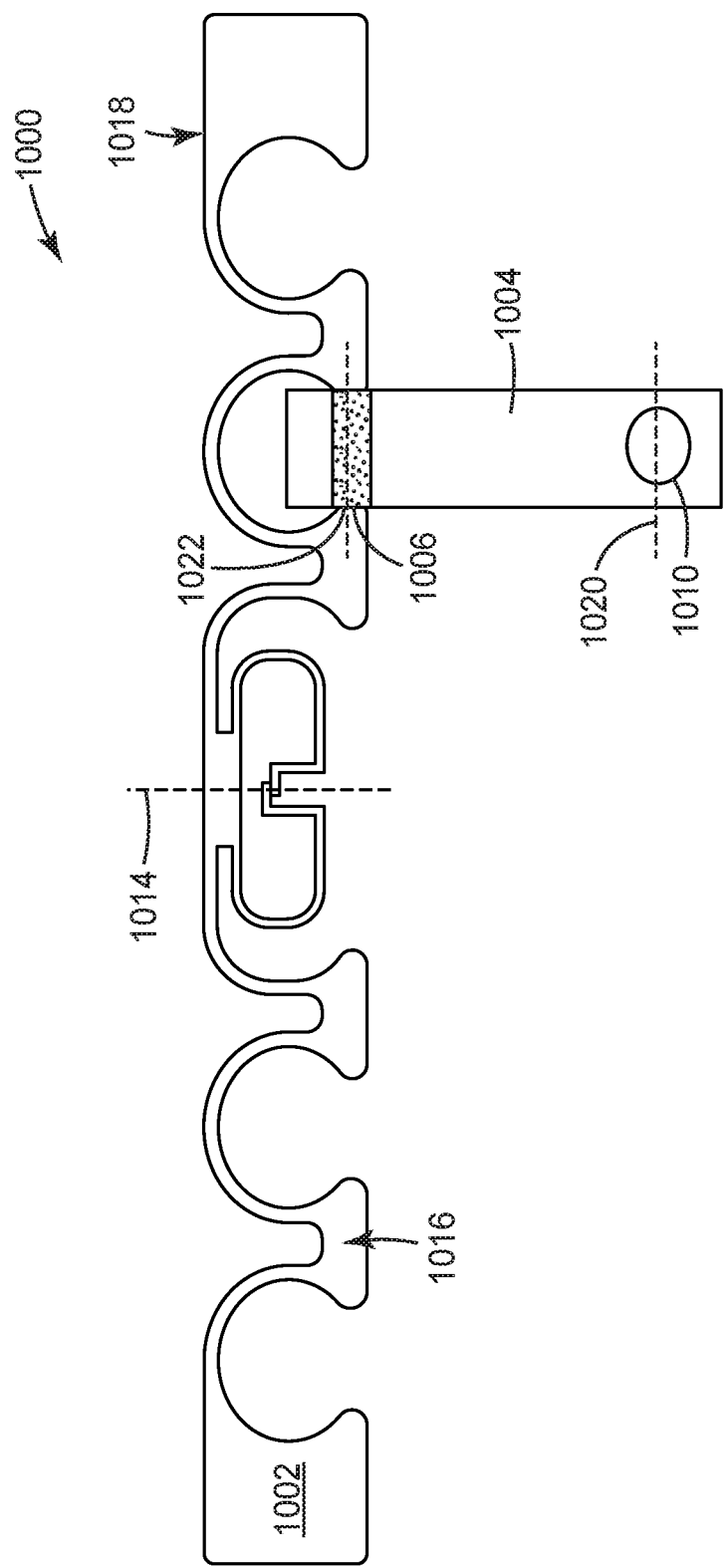

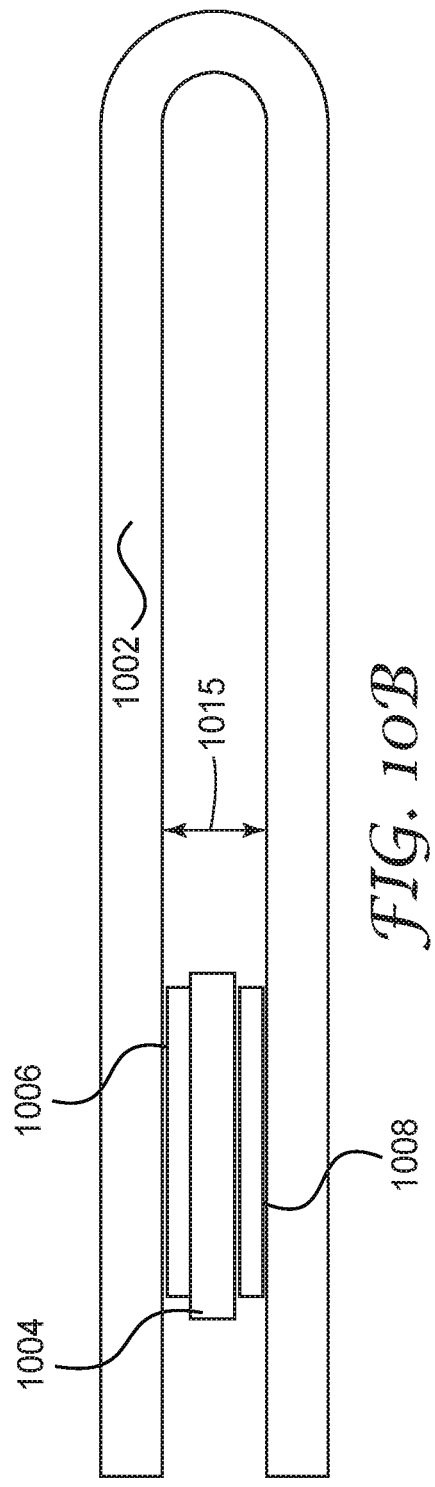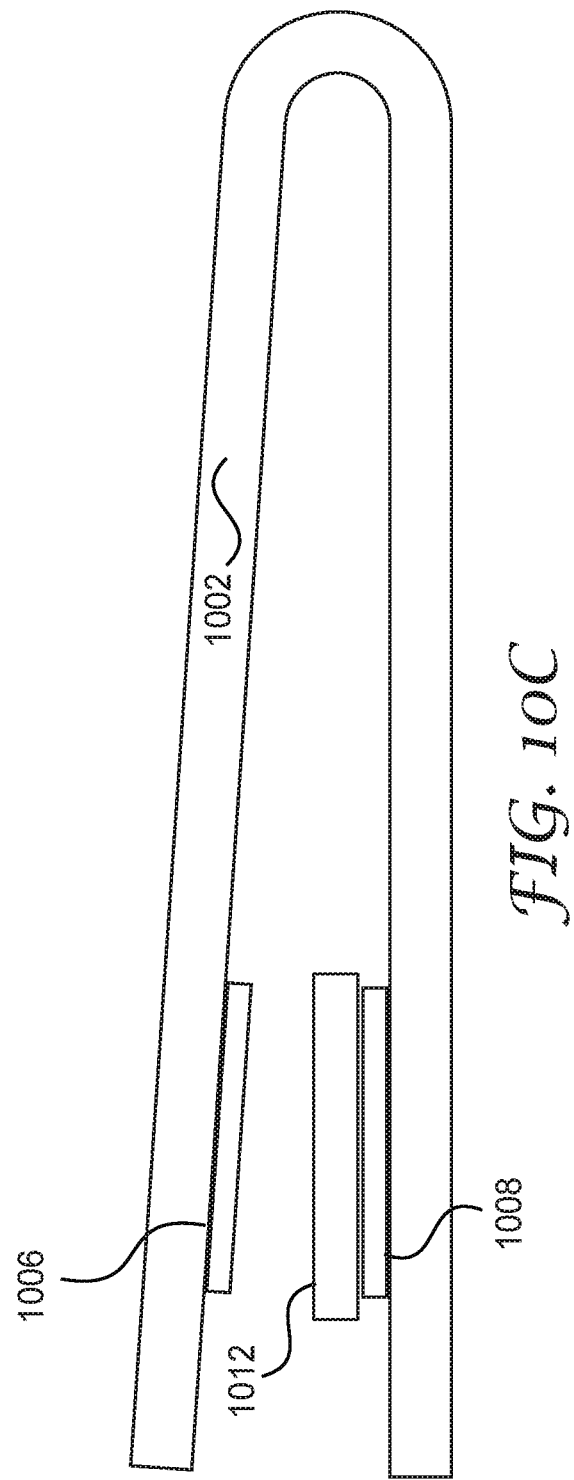

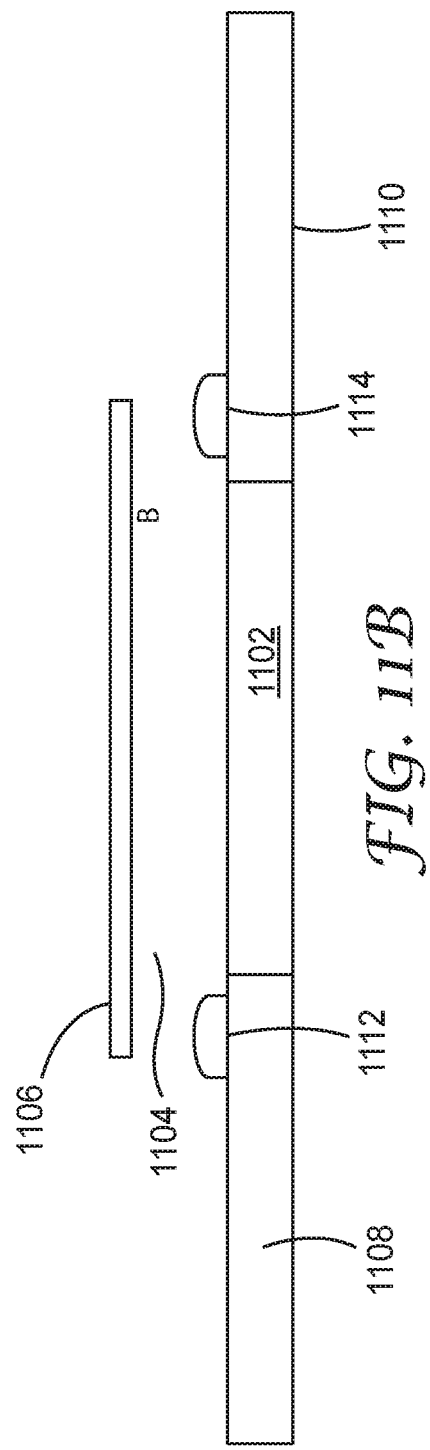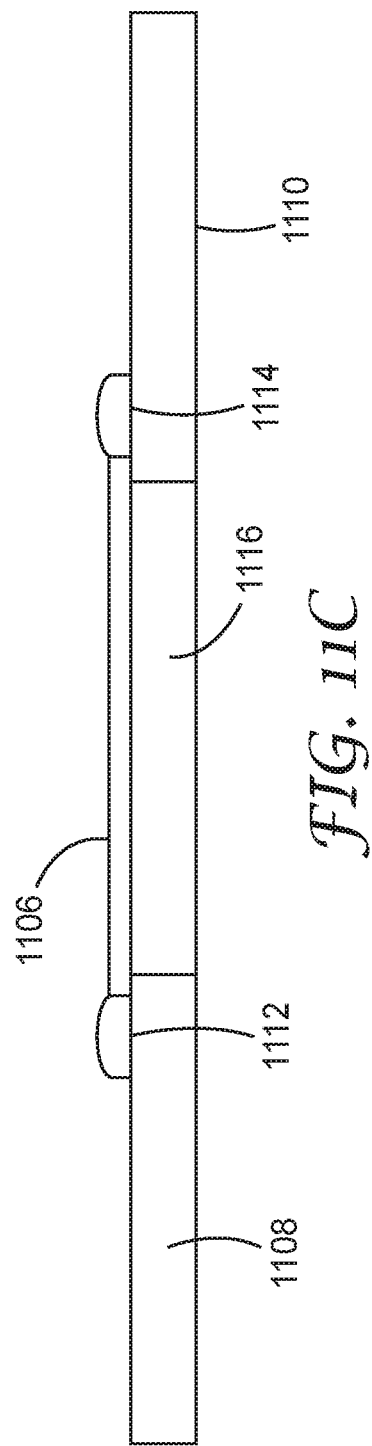

STERILIZATION INDICATOR SENSOR WITH A STERILANT-RESPONSIVE SWITCH

CROSS REFERENCE TO RELATED APPLICATIONS

This application is a national stage filing under 35 U.S.C. 371 of PCT/IB2020/053773, filed Apr. 21, 2020, which claims the benefit of Provisional Application No. 62/837,979, filed Apr. 24, 2019, the disclosure of which is incorporated by reference in its/their entirety herein.

BACKGROUND

Radio frequency identification (RFID) circuitry has been used to detect the presence and movement of articles of interest. The presence of an article bearing an RFID tag may be electronically detected by wirelessly interrogating the RFID tag, either intermittently or continuously. In a typical application, the RFID tag stores an identification (ID) code. When interrogated by an RFID tag reader, the RFID tag wirelessly transmits its ID code to the RFID tag reader. The code transmitted by the RFID tag to the RFID tag reader indicates the presence and identification of the article bearing the RFID tag.

RFID tags may include a battery or other independent power source, or they may acquire their power from the signal transmitted by the external RFID tag reader. RFID tags without independent power are particularly small and inexpensive, making them very cost effective for tracking a large number of objects.

A technology related to RFID involves electronic article surveillance (EAS) tags. Both EAS and RFID tags are remotely accessible, but EAS tags typically do not include the data storage capabilities of RFID. Both EAS and RFID tags include a transponder circuit for remote access. The transponder circuit is a resonant circuit having components selected and arranged so that the transponder electrically resonates at a particular frequency.

If an electromagnetic signal at or near the transponder resonant frequency is emitted from a tag reader within range of the EAS tag, the EAS transponder circuit absorbs and/or reflects energy from the electromagnetic field emitted by the reader through a mechanism (e.g., magnetic field, in near-field such as capacitive coupling or inductive coupling, far-field such as electromagnetic backscattering). The energy absorbed or reflected by the transponder circuit can produce a change in the output signal of the tag reader output coil or in the input signal at the tag reader receiving coil. These signal changes may be interpreted to indicate the presence of an EAS tagged article.

In some applications, it is desirable to remotely acquire sensor device information. The remote access capabilities of RFID and EAS tags may be combined with sensor device technology to provide remote sensing capability.

In the current practice of evaluating a chemical indicator visually, a user needs to visually judge the color development to determine if the chemical indicator was subjected to an adequate sterilization process. However, color development can be subjective.

BRIEF SUMMARY

While there are some examples of sterilization indicators paired with sensors, the existing sensors do not have conductive traces bridged with a sterilant-responsive switch. It has been found that a sterilant-responsive switch can produce a more definitive remote sensor reading.

Aspects of the present disclosure relate to a sensor device having an integrated circuit and a monitoring loop coupled to the integrated circuit. The monitoring loop includes a first conductive trace and a second conductive trace, each having a first end electrically coupled to the integrated circuit and a second end. The monitoring loop includes a sterilant-responsive switch electrically coupling the second ends of the first conductive trace and the second conductive trace. The sterilant-responsive switch has a first impedance state and a second impedance state. The sterilant-responsive switch modifies an electrical connection between the first conductive trace and the second conductive trace based on exposure to an adequate environmental condition in an adequate sterilization process. The sensor device also includes an antenna coupled to the integrated circuit forming an antenna loop that is distinct from the monitoring loop.

Additional aspects of the present disclosure relate to a system including the sensor device or a sterilization indicator sensor. The sterilization indicator sensor also includes the sensor device, a first substrate, and an environmental change receptor that is proximate to the first substrate. The sterilant-responsive switch can contact the first substrate.

Additional aspects of the present disclosure can also relate to a method. The method includes providing the sterilization indicator sensor comprising the sensor device. The method also includes exposing the sensor device to an adequate environmental condition in a sterilization process, wherein the adequate environmental condition comprises a sterilant. The method also includes allowing the sterilant-responsive switch to absorb the sterilant which changes the sterilant-responsive switch from a first impedance state to a second impedance state.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 9 illustrates a sterilization indicator sensor 900 in accordance with one embodiment.

FIG. 10A illustrates a sterilization indicator sensor 1000 in an unfolded state in accordance with one embodiment. FIG. 10B illustrates a sterilization indicator sensor 1000 in a folded state in accordance with one embodiment. FIG. 10C illustrates a sterilization indicator sensor 1000 in an unfolded state in accordance with one embodiment.

FIG. 11B illustrates a cross-sectional view of a sterilization indicator sensor 1100 in a second impedance state in accordance with one embodiment. FIG. 11C illustrates a side view of a sterilization indicator sensor 1100 in a first impedance state in accordance with one embodiment.

DETAILED DESCRIPTION

Aspects of the present disclosure relate to a sensor device having a sterilant-responsive switch that is responsive to environmental conditions (including sterilant) in a sterilization process. The sterilant-responsive switch can be electrically coupled to conductive traces of the sensor device and can be mechanically activated or formed from a polymeric gate material.

Figure 1:
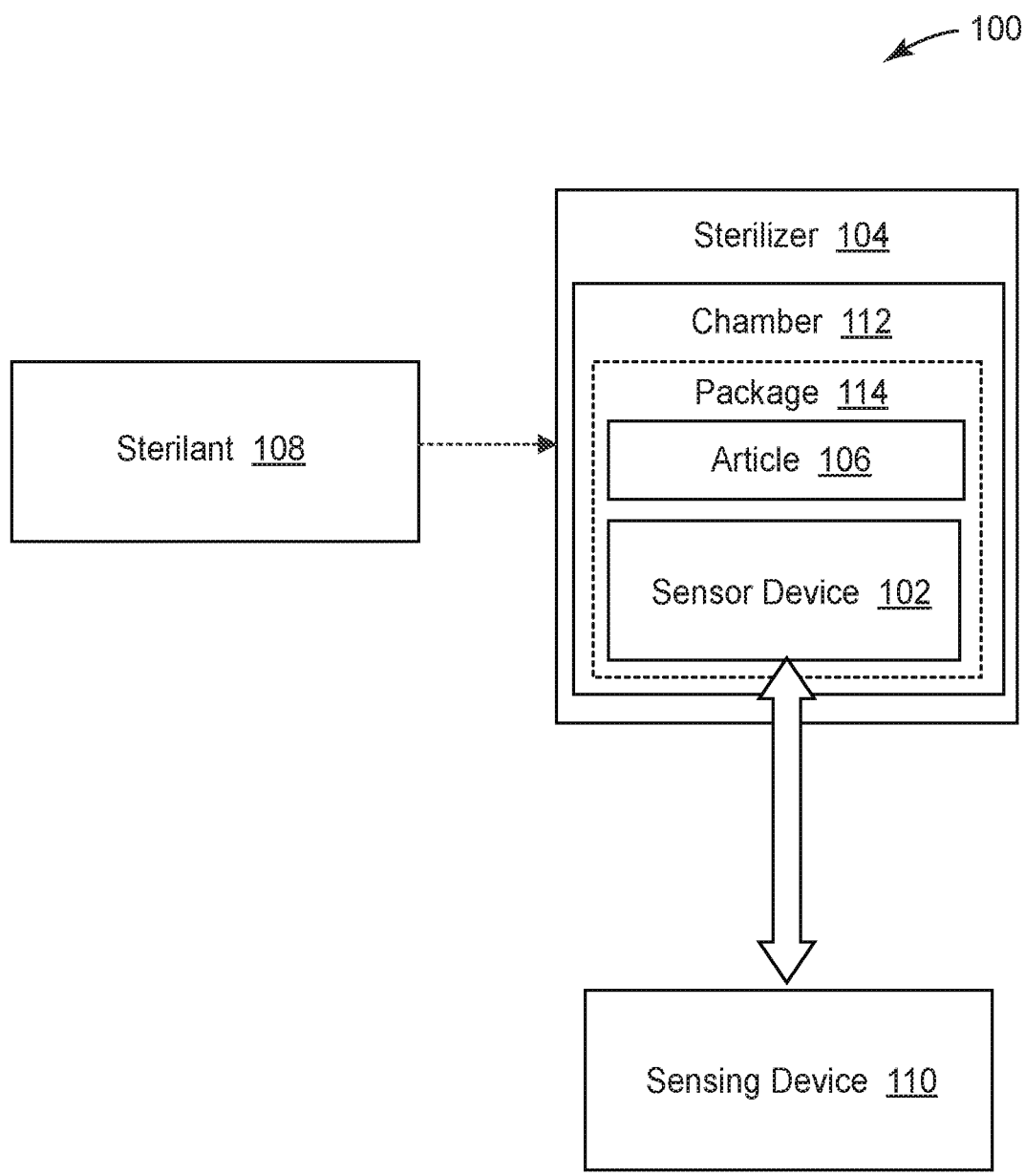
FIG. 1 illustrates a sterilization indicator system 100 in accordance with one embodiment.

FIG. 1 illustrates a sterilization indicator system 100. The sterilization indicator system 100 can include a sterilizer 104.

The sterilizer 104 is configured to provide a sterilant 108 to a chamber 112 in a sterilization process. Various examples of sterilizer 104 can exist and each sterilizer can differ as to the type of sterilant 108 provided. The primary types of sterilizer 104 are based on steam, or hydrogen peroxide and each type can have different sterilization process conditions. Examples of sterilizers using hydrogen peroxide as a sterilant are commercially available from Steris (Mentor, OH) or Tuttnauer (Israel). Examples of sterilizers using steam as a sterilant are commercially available from Steris (Mentor, OH).

The chamber 112 can have one or more environmental conditions. In at least one embodiment, the environmental condition can be related to conditions inside of the chamber 112 and can include time, sterilant, temperature, pressure, or combinations thereof. For example, a first environmental condition can exist pre-sterilization process and a second environmental condition can exist during the sterilization process. A sensor device 102 can determine whether the second environmental condition corresponds to an adequate sterilization process. As used herein, the second environmental condition can be referred to as an adequate environmental condition. An adequate sterilization process can vary based on the sterilant used, the manufacturer of the sterilizer, and the article 106 to be sterilized. For example, Guideline for Disinfection and Sterilization in Healthcare Facilities, Center for Disease Control (2008) provides minimum cycle times for sterilization of various article 106 types and sterilant 108 in Tables 1 and 7, which are incorporated by reference.

The sterilization indicator system 100 includes a sensor device 102 that is capable of collecting and providing data regarding the environmental conditions within chamber 112 with respect to the sterilization process. Further, the sensor device 102 can also be read by a sensing device 110. The sensing device 110 is an electronic device that can read the environmental conditions remotely. In one example, the sensing device 110 can read the sensor device 102 to determine environmental conditions in the chamber 112 in real-time through the walls of the chamber 112. For example, a wall can have a hole formed therein for directly reading an RFID tag through the steel wall. In another example, the sensing device 110 can read/interrogate the sensor device 102 to determine environmental conditions of the chamber 112 when outside of the walls of the chamber 112, e.g., when in a wrapped package 114. In at least one embodiment, an adequate sterilization process can change the electrical impedance of the sensor device 102 and be detected by the sensing device 110.

The sensing device 110 can use wireless communication or wired communication to read the sensor device 102. For example, if wired, then the sensor device 102 can include a memory element to store the environmental conditions captured by the sensor device 102. In at least one embodiment, the sensor device 102 can be affected by past environmental conditions and be chemically or electrically modified. For example, the sensor device 102 can also include a sterilant-responsive switch that indicates, directly or indirectly, the environmental condition from the sterilization process in the chamber 112.

The sensor device 102 can include any type of sterilant-resistant integrated circuit. For example, the sensor device can be an RFID tag, a thermometer, a pressure sensor, a communication device, or combinations thereof. In at least one embodiment, the sensor device 102 is an RFID tag and the sensing device 110 is an RFID interrogator device. Example RFID interrogator devices can be based on UHF and commercially available from Zebra (Lincolnshire, IL), Alien Technology (San Jose, CA), or Impinj (Seattle, WA)." Other example RFID interrogator device can also be based on High Frequency (HF) and commercially available from Jadak (Syracuse, NY), Technology Solutions Ltd (United Kingdom), Samsung, or Apple or be based on Low Frequency (LF) and commercially available from RFID Inc. (Aurora, CO), Gao RFID Inc. (Ontario, Canada), or SkyRFID Inc. (Ontario, Canada)."

The sensor device 102 can be paired with one or more components such as a substrate and environmental change receptor to form a sterilization indicator sensor which is described further herein. In at least one embodiment, the environmental change receptor is distinct from the sterilant-responsive switch. For example, the environmental change receptor can be configured to affect the admittance/impedance of the sterilant-responsive switch.

In at least one embodiment, the article 106 and sensor device 102 can be wrapped in a package 114. The sensor device 102 can be responsive to the sterilization process occurring in the chamber 112. The sensor device 102 can be read as to determine whether the using the sensing device 110 without unwrapping the package 114 which helps assure sterility of the article 106 to an end user.

Figure 2:
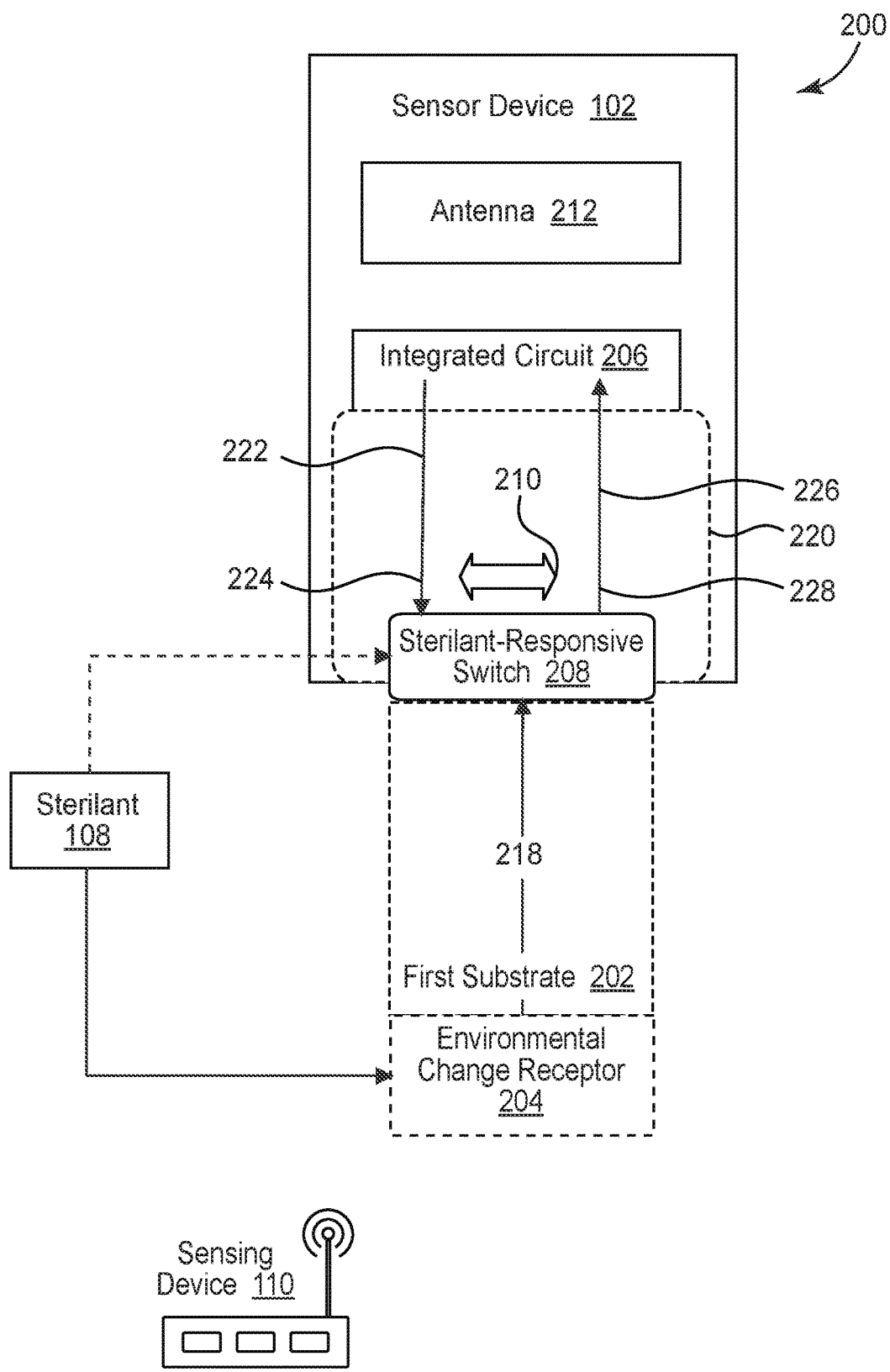
FIG. 2 illustrates a sterilization indicator sensor 200 in accordance with one embodiment.

FIG. 2 illustrates a sterilization indicator sensor 200 for use in the sterilizer.

The sterilization indicator sensor 200 can include the sensor device 102 described herein. In at least one embodiment, the sensor device 102 includes an antenna 212 which is capable of receiving energy from and transmitting data to a sensing device 110. Antenna 212 can be various shapes that are optimized for transmission to the sensing device 110. One example of an antenna 212 design is commercially available from Smartrac (Netherlands) under the Model name BELT.

In at least one embodiment, the antenna 212 can be formed such that it is unaffected by the sterilization process. For example, the antenna 212 can have no breaks within an antenna loop (but the sensor device 102 may have a break within the monitoring loop 220). The antenna 212 can be electrically coupled to the integrated circuit 206 and form the antenna loop. The integrated circuit 206 can harvest energy from the sensing device 110 to transmit the antenna 212 impedance. Various integrated circuit 206 devices can be designed for RFID applications, such as passive, semi-active, and active RFID applications, and commercially available from NXP Semiconductors (Netherlands), Impinj (Seattle, WA), or Axzon (Austin, TX). An example of the integrated circuit 206 is under the trade designation Magnus from Axzon (Austin, TX) or the UCODE G2iM or G2iL+ from NXP Semiconductors which can include UHF RFID transponder capability and a tag tamper alarm capable of measuring the state of the monitoring loop 220.

In at least one embodiment, the sensor device 200 can include a second integrated circuit responsive to a different frequency than the first integrated circuit. The second integrated circuit can be electrically coupled to the antenna 212 or a second antenna. The second integrated circuit can also be electrically coupled to the monitoring loop.

A monitoring loop 220 can be electrically coupled to the integrated circuit 206. In at least one embodiment, the monitoring loop 220 is configured to electrically change based on exposure to an adequate sterilization process. For example, the monitoring loop 220 can increase or decrease in admittance/impedance based on exposure to an adequate sterilization process.

The monitoring loop 220 includes conductive trace 214 having a first end 222 and a second end 224 and conductive trace 216 having first end 226 and second end 228. The first ends of both conductive trace 214 and conductive trace 216 are electrically coupled to the integrated circuit 206. In at least one embodiment, the second ends of conductive trace 214 and conductive trace 216 are not integrally attached using the same material as that of conductive trace 214 or conductive trace 216. In at least one embodiment, the second ends of conductive trace 214 and conductive trace 216 can each be connected through a sterilant-responsive switch 208. In at least one embodiment, the conductive traces can also include adjacent microreplicated channels for capillary flow parallel to the conductive trace.

In at least one embodiment, the distance 210 between conductive trace 214 and conductive trace 216 as measured along a sterilant-responsive switch 208. The distance 210 can be sufficient to sense a change in the electrical admittance/impedance without causing electrical shorts or interference between the conductive trace 214 and conductive trace 216. For example, if the distance 210 is zero, then conductive trace 214 and conductive trace 216 would be electrically coupled regardless of changes in the sterilant-responsive switch 208 and the monitoring loop 220 would not sense the environmental condition.

The monitoring loop 220 can also include the sterilant-responsive switch 208 which is electrically modifiable based on exposure to environmental conditions for the sterilization process, particularly an adequate sterilization process. The sterilant-responsive switch 208 can be based on polymeric gate material or mechanical interaction with various components such as an environmental change receptor 204. In at least one embodiment, the sterilant-responsive switch 208 can be binary. For example, the sterilant-responsive switch 208 can be triggered from off to on indirectly based on interaction of the sterilant with environmental change receptor 204.

The sterilant-responsive switch 208 can also have a graduated response to the environmental condition. For example, a polymeric gate material may suffer from gradual electrical admittance degradation based on interaction from a sterilant 108. Examples of sterilant-responsive switch 208 are described further herein.

Further, the sensing device 110 can be configured to interrogate the sensor device 102 such that the sensor device 102 provides a plurality of impedance states over time which can correspond to various environmental conditions in the sterilization process. For example, the sensor device 102, when exposed to a first environmental condition, can transmit a first impedance state based on the interaction (direct or indirect) of the sterilant-responsive switch with the first environmental condition. An environmental condition can change the measured capacitance of the sterilant-responsive switch 208. The sensor device 102, when exposed to a second environmental condition, can transmit a second impedance state based on the interaction (direct or indirect) of the sterilant-responsive switch with the second environmental condition, and so forth with a third impedance state and a fourth impedance state. In at least one embodiment, the sensing device 110 can determine the environmental conditions based on the impedance states and provide a graduated view of the environmental conditions over time (as opposed to a binary pass/fail that may be present).

A polymeric gate material can be any substance that has semi-conductive properties or that is switchable between a first impedance state and a second impedance state, for example, a solid substance that has conductivity between that of an insulator and a metal. In at least one embodiment, the impedance state can be related to the impedance and the admittance of the sensor device. The impedance state can be related to an opposition to flow of the polymeric gate material and include aggregation of its resistance, and inductive and capacitive reactances.

The polymeric gate material can include an electrically active polymer that changes from a first impedance state to a second impedance state or a second impedance state to a first impedance state based on interactions with an environmental change receptor 204, an environmental condition, a conductive trace, or combinations thereof. In at least one embodiment, the first impedance state can either correspond to having higher or lower impedance relative to the second impedance state depending on the mechanism. For example, polyaniline can switch from non-conductive to conductive or vice versa. In at least one embodiment, the first impedance state refers to having an admittance and impedance sufficient to electrically bridge an open circuit, e.g., having an admittance of at least 2 siemens.

The electrically active polymer can be a semi-flexible rod polymer. In at least one embodiment, the electrically active polymer is polyaniline (PANI), trans-polyacetylene, poly (p-phenylene), poly(3-vinylperlene), polypyrrole, poly(2,5-bis(3-tetradecylthiophene-2-yl)thieno[3,2-b]thiophene), poly(2-(3-thienyyloxy)ethanesulfonate), polythiophene, or combinations thereof. The electrically active polymer can be doped or undoped with various dopants such as dinonylnaphthalene sulfonic acid (DNNSA), sodium, arsenic pentafluoride, triiodide, camphorsulfonate, methanesulfonic acid, halogens or polyhalogen ions, methanol, hydrogen sulfate, hydrochloric acid, tetrafluoroborate, sodium sulfite, or combinations thereof. Preferably, the polymeric gate material is PANI which can be in one of three oxidation states (leucoemeraldine, emeraldine (in the salt or base forms), and per(nigraniline). The emeraldine can be non-conductive in the base form and conductive in the salt form. Further, the emeraldine salt can be converted into the leucoemeraldine salt or per(nigraniline) via a redox reaction to make the leucoemeraldine salt non-conductive.

In at least one embodiment, various conductive materials can be added to the polymeric gate material. For example, nanoparticles of tin, aluminum, copper, silver, gold, or combinations thereof, can be blended and incorporated into a PANI formulation for coating between two conductive traces.

In at least one embodiment, the conductive trace 214 and conductive trace 216 can be coated with or formed from a conductive material. The use of aluminum has been surprisingly found to directly react with PANI and convert emeraldine salt into leucoemeraldine salt. The monitoring loop 220 can thus turn from a first impedance state to a second impedance state based on the redox reaction of the polymeric gate material with aluminum at the environmental condition corresponding to an adequate sterilization process (e.g., of steam).

In at least one embodiment, the sterilization indicator sensor 200 can include only the sensor device 102. The sterilization indicator sensor 200 can also optionally include the first substrate 202 and/or the environmental change receptor 204.

In at least one embodiment, a portion of the sterilant-responsive switch 208 can contact the first substrate 202. The first substrate 202 can be either wicking or non-wicking. If non-wicking, the first substrate 202 can be any metallic layer such as aluminum foil, or polymeric layer such as polyethylene, polyurethane, or polyester layer. In at least one embodiment, the first substrate 202 can provide structural support to the sensor device 102. The first substrate 202 can also provide support to the environmental change receptor 204.

If wicking, the first substrate 202 can be any suitable material through which the organic compound can migrate by capillary action. The preferred wicking first substrate 202 is a paper strip. Other such wicking materials such as non-woven polymeric fabrics and inorganic fibrous compositions may be used. The dimensions of the wicking first substrate 202 is not critical. However, its dimensions (thickness and width) will affect the rate of wicking and determine the quantity of organic compound required to result in a suitable scale length. Hence, from an economic standpoint the wicking first substrate 202 should be as thin as practical. A suitable width for the first substrate 202 is about 3/16 to about 1/4 of an inch. Examples of the wicking first substrate 202 are Whatman No. 1 filter paper, Whatman No. 114 filter paper, supported microcrystalline cellulose (TLC plate), supported aluminum oxide, and supported silica gel.

In at least one embodiment, the environmental change receptor 204 is disposed proximate the first substrate 202. For example, the environmental change receptor 204 can be positioned such that the environmental change receptor 204 flows onto the first substrate 202 and is wicked from a first substrate position to a second substrate position (which may correspond to a portion of the sterilant-responsive switch 208) as indicated by flow direction 218. In at least one embodiment, the environmental change receptor 204 can also be disposed directly on the first substrate 202 at the first substrate position. In at least one embodiment, the environmental change receptor 204 is disposed proximate or adjacent to the sterilant-responsive switch 208. In at least one embodiment, the environmental change receptor 204 is solid and can be in the form of a tablet and disposed outside of the first substrate 202. In at least one embodiment, the environmental change receptor 204 can be embedded within or layered upon the first substrate 202.

The environmental change receptor 204 can include one or more environmentally responsive or sensitive materials selected depending on the sensing needs. The environmentally responsive material can be selected based on its solubility, boiling point, melting point, ability to absorb gases or liquids, softening point or flow properties, such that it changes properties (evaporates or redistributes on the sensor strip) in response to specific environmental conditions. In some cases, the environmental change receptor 204 can include more than one part, where each part can include similar or different environmentally responsive materials and be disposed at different locations. In at least one embodiment, the environmental change receptor 204 can be selected based on an ability to change the admittance/impedance of the sterilant-responsive switch. The environmental change receptor 204 can be acidic or basic to affect the first impedance state of a polymeric gate material. For example, if the environmental change receptor 204 is basic, then the base can react with emeraldine salt to form emeraldine base and change from a first impedance state to a second impedance state.

The environmental change receptor 204 can include a type of meltable or flowable material, for example, crystalline or semi-crystalline materials (e.g., Tetra-n-butylammonium bromide (TBAB)), thermoplastics, polymers, wax, organic compounds such as salicylamide, polyethylene-co-acrylic acid, sucrose and the like. In some cases, the environmentally responsive material is selected based on its response to combined conditions of temperature and humidity, or temperature, humidity and time. The material can be selected to tailor to a particular application. In some embodiments to monitor the presence of chemical substance, the environmental change receptor 204 can include a type of material absorbing or reacting with the chemical substance. In an example of detecting gas, the environmental change receptor 204 can include Zeolite HiSiv 3000 powder from UOP LLC, Des Plaines, IL Some environmental change receptors can be responsive to a steam sterilant in environmental conditions for an adequate sterilization process. In at least one embodiment, the environmental change receptor 204 can include an organic base having a melting point of greater than 100 degrees C. and miscible with salicylamide. For example, the organic base can be N, N-dimethylpyridine, adamantylamine, or combinations thereof.

Some environmental change receptors can also be responsive to a steam or hydrogen peroxide sterilant in an adequate sterilization process. Such an environmental change receptor can include various pigments and inks such as a blue colored ink and a pink pigment. Further the environmental change receptor can include an organic ester that is solid at room temperature. In at least one embodiment, the sterilant 108 can interact with environmental change receptor 204, sterilant-responsive switch 208, or both to produce a change which would affect sensor device 102.

Figure 3A:
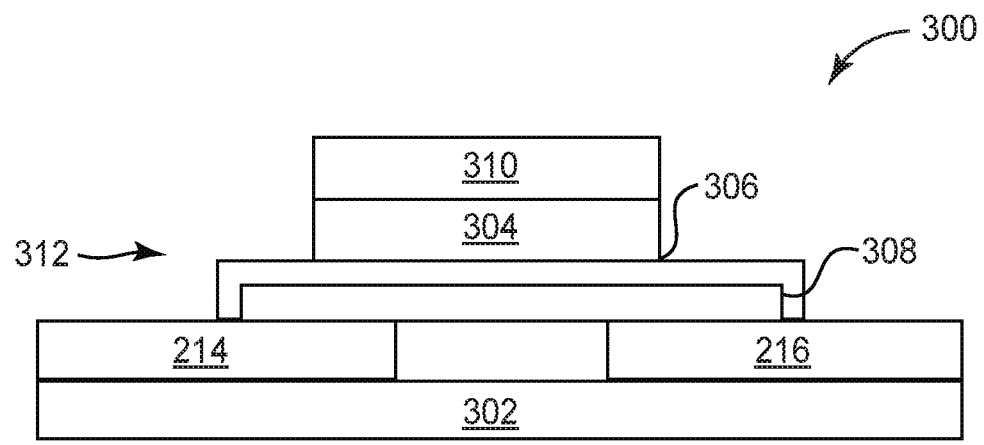
FIG. 3A illustrates a side view of sterilization indicator sensor 300 in accordance with one embodiment.
Figure 3B:
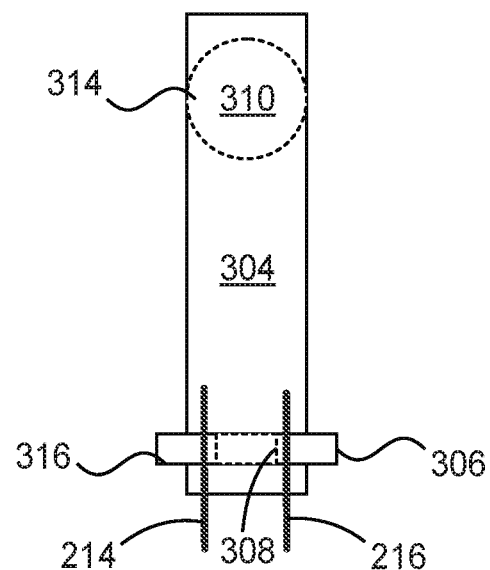
FIG. 3B illustrates a top view of the sterilization indicator sensor 300 in accordance with one embodiment.

FIGS. 3A-B illustrate a sterilization indicator sensor 300 that is similar to sterilization indicator sensor 200 except having a different sterilant-responsive switch.

The sterilant-responsive switch 312 can include a conductive element (e.g., conductive ink 306) and a pH-sensitive polymer 308 layered with respect to one another. Conductive ink 306 can be an ink that results in a printed object which conducts electricity. The conductive ink 306 can be printable via an inkjet printer or screen printing and present as a continuous layer. The conductive ink 306 is of a thickness that is robust enough to withstand handling but thin enough to be affected by changes in the pH-sensitive polymer 308. For example, the average thickness of a layer of the conductive ink 306 can be no greater than 25 microns, preferably no greater than 10 microns. The conductive ink 306 can include particles of conductive metals such as copper, silver, or also non-metals such as graphite. Various conductive ink 306 formulations are commercially available from Novacentrix (Austin, TX) under the trade designation Metalon.

The pH-sensitive polymer 308 is selected from, but not limited to the group consisting of methacrylic acid copolymers (such as Eudragit E®, Eudragit E100 (also referred to as butylmethacylat-(2-dimethylaminoethyl)-methacrylat-methylmethacylat-copolymer (1:2:1)), is a copolymer based on (2-dimethylaminoethyl)methacrylate, butyl methacrylate and methyl methacrylate having a mean molecular weight of about 150,000), chitosan and its derivatives (linear polysaccharide composed of randomly distributed-(1-4)-linked D-glucosamine (deacetylated unit) and N-acetyl-D-glucosamine (acetylated unit)), or other high molecule weigh polymer with cationic function group, cellulose derivatives such as cellulose acetate phthalate (CAP), hydropropyl methylcellulose phthalate (HPMCP-50 or HPMCP-55), hydroxypropyl methylcellulose acetate succinate (HPMCAS), alkali-soluble acrylic copolymers (Eudragit® L series and Eudragit® S series), polyvinyl acetate phthalate (PVAP), alginates, Carboxymethyl cellulose (CMC), or mixtures of one or more thereof. In at least one embodiment, the pH-sensitive polymer 308 can be a polymer that is acid-soluble and dissolves when exposed to acidic conditions (i.e., less than pH of 7). Preferred examples of pH-sensitive polymer 308 degrade under a pH of less than 7 (acidic conditions) but is stable in water at a pH of 7 or above and are commercially available from Evonik Industries (Germany) under the trade designation Eudragit model E PO. The pH-sensitive polymer 308 can form a layer between the gap of the conductive traces. The layer should have sufficient thickness to dissolve in response to an environmental change receptor 310. In at least one embodiment, the (average) thickness of the layer of the pH-sensitive polymer 308 is no greater than 150 microns, no greater than 125 microns, no greater than 50 microns, or no greater than 5 microns.

The sterilization indicator sensor 300 can also include an environmental change receptor 310 which is an embodiment of environmental change receptor 204. The environmental change receptor 310 can be in solid form and interact with the sterilant. For example, the sterilant can solubilize or change the state of the environmental change receptor 310 and the environmental change receptor 310 can be transported along a first substrate 304 from a first substrate position 314 to a second substrate position 316. An example of environmental change receptor 310 is a salicylamide tablet (which has a pH of about 5 when combined with water).

The sterilization indicator sensor 300 can also include the first substrate 304. The first substrate 304 is an embodiment of first substrate 202 and is wicking. In at least one embodiment, the first substrate 304 carries the environmental change receptor 310 to the sterilant-responsive switch 312. The environmental change receptor 310 can degrade the pH-sensitive polymer 308 such that the conductive ink 306 breaks and electrical conductivity between conductive trace 214 and conductive trace 216 of the sensor device is degraded.

In at least one embodiment, the sterilization indicator sensor 300 also includes a second substrate 302 to support the sensor device (e.g., including conductive trace 214 and conductive trace 216). The second substrate 302 can generally be non-wicking and be made of flexible polymers such as polyester, polyethylene, polyurethane, polypropylene, polystyrene, polyethylene terephthalate, or combinations thereof; or metals that are capable of forming flexible sheets of material.

In at least one embodiment, at least the conductive trace 214 and conductive trace 216 of the sensor device can be disposed on the second substrate 302. The pH-sensitive polymer 308 can be coated onto a flexible polymer and adhered over a gap between conductive trace 214 and conductive trace 216. A layer of conductive ink 306 no greater than 50 microns can be applied over the pH-sensitive polymer 308 such that either side of a trace formed by the layer of conductive ink 306 contacts both conductive trace 214 and conductive trace 216.

In at least one embodiment, at least a portion of the first substrate 304 can contact the pH-sensitive polymer 308 at a second substrate position 316 such that wicked environmental change receptor 310 can interact with the pH-sensitive polymer 308 and cause the conductive ink 306 mechanically supported by the pH-sensitive polymer 308 to break and lose conductivity. In at least one embodiment, the sterilization indicator sensor 300 can additionally be packetized to hold components together. In at least one embodiment, the resulting signal from a sensor device can be null when the conductive ink 306 is broken.

Figure 4:
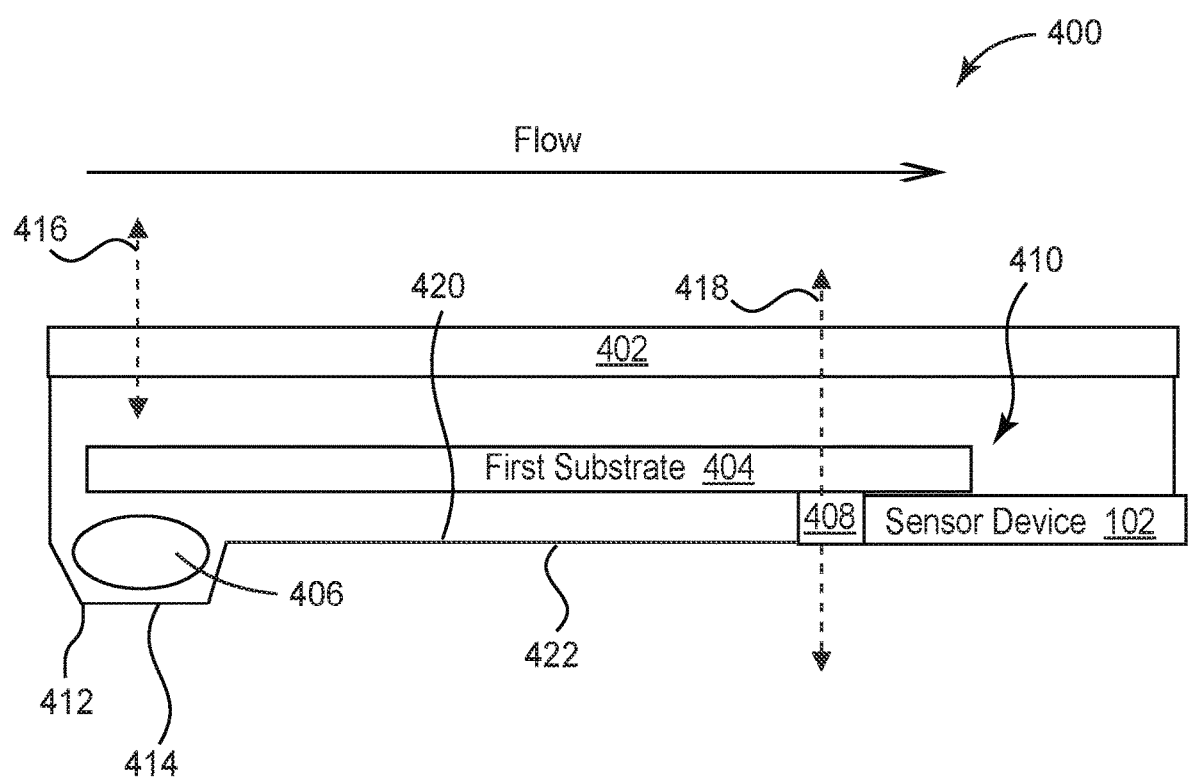
FIG. 4 illustrates a side view of sterilization indicator sensor 400 in accordance with one embodiment.

FIG. 4 illustrates an embodiment of a sterilization indicator sensor 400. The general construction can be modified to include a sensor device based on a chemical integrator commercially available from 3M (Saint Paul, MN) under the trade designation Comply.

The sterilization indicator sensor 400 can include a first substrate 404. The first substrate 404 can be wicking and an embodiment of first substrate 202. The first substrate 404 can extend longitudinally along sterilization indicator sensor 400. In at least one embodiment, the first substrate 404 can contact a polymeric gate material 408 at a second substrate position 418 and be positioned to absorb environmental change receptor 406 (as described herein) at a first substrate position 416. In at least one embodiment, the sterilant-responsive switch can be a polymeric gate material 408 as described herein and be electrically coupled to the sensor device 102. In at least one embodiment, the environmental change receptor 406 is preferably an acidic salt such as salicylamide and the polymeric gate material 408 can preferably be polyaniline. Doping with the acid can convert the emeraldine base from a second impedance state to emeraldine salt in a first impedance state.

The sterilization indicator sensor 400 can also have a second substrate 422 formed from a non-wicking substance and described herein. In at least one embodiment, the second substrate 422 includes an aluminum layer. The second substrate 422 can have a first packaging surface 412 and a second packaging surface 420. The first packaging surface 412 can face outward and the second packaging surface 420 can face toward the first substrate 404. In at least one embodiment, the second substrate 422 can have a depression 414 formed on second packaging surface 420 therein (which can form a protrusion on the opposite first packaging surface 412). The depression 414 can intersect with the first substrate position 416. The depression 414 can hold a portion of the environmental change receptor 406. In at least one embodiment, the depression 414 can have a volume of less than the liquid state of the environmental change receptor 406 so that the environmental change receptor 406 can contact the first substrate 404.

The sterilization indicator sensor 400 can have a cover substrate 402 that is configured to mate with a portion of the second substrate 422. The cover substrate 402 can be formed from a flexible polymeric material, paper material, or combinations thereof. In at least one embodiment, the environmental change receptor 406 is visible through a cutout of the cover substrate 402. In at least one embodiment, a channel 410 is formed between the second substrate 422 and the cover substrate 402. In at least one embodiment, the channel 410 can include a portion of the depression 414. In at least one embodiment, the first substrate 404 can be positioned within the channel 410. In at least one embodiment, the polymeric gate material 408 and the sensor device 102 can also be positioned in the channel 410.

Figure 5A:
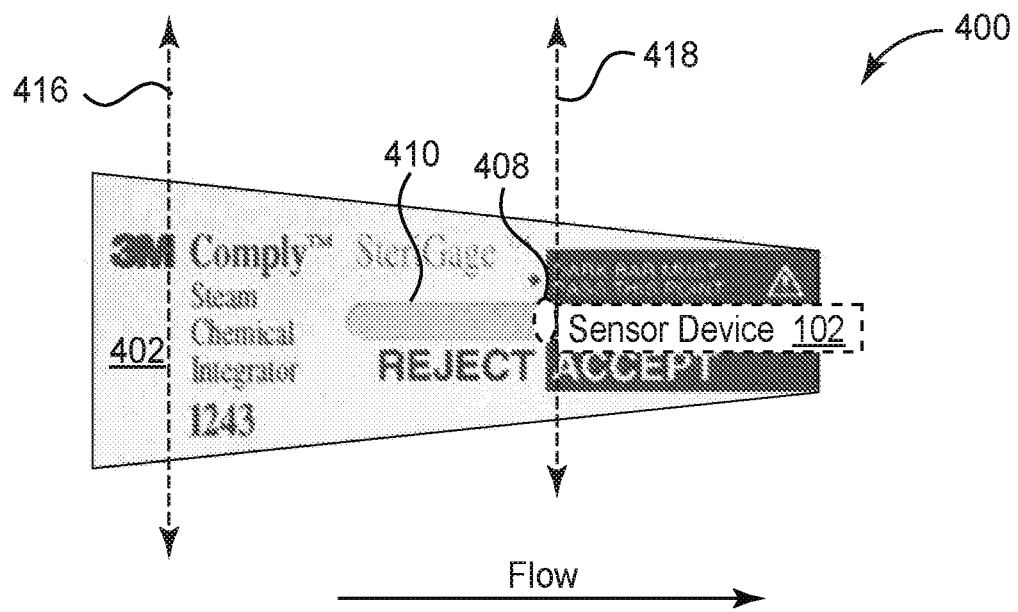
FIG. 5A illustrates a top elevational view of a sterilization indicator sensor 400 in accordance with one embodiment.
Figure 5B:
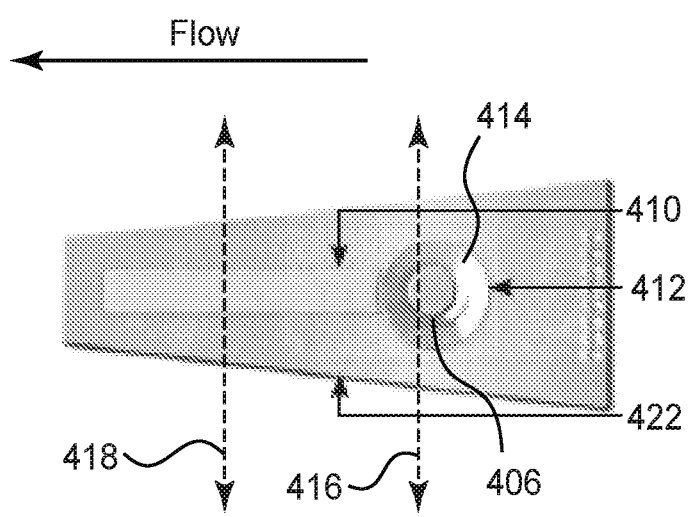
FIG. 5B illustrates a bottom view of the sterilization indicator sensor 400 in accordance with one embodiment.

FIGS. 5A and 5B illustrate a different view of the sterilization indicator sensor 400. After the sterilizer has achieved an adequate sterilization process, the environmental change receptor 406 can flow along the first substrate 404 from a first substrate position 416 to a second substrate position 418. The polymeric gate material 408 can be located at a second substrate position 418. The polymeric gate material 408 can react with the environmental change receptor 406 and change the admittance/impedance which electrically changes the sensor device 102. As shown, the sterilization indicator sensor 400 produces both a visual change and an electrochemical change in response to an adequate sterilization process.

Figure 6:
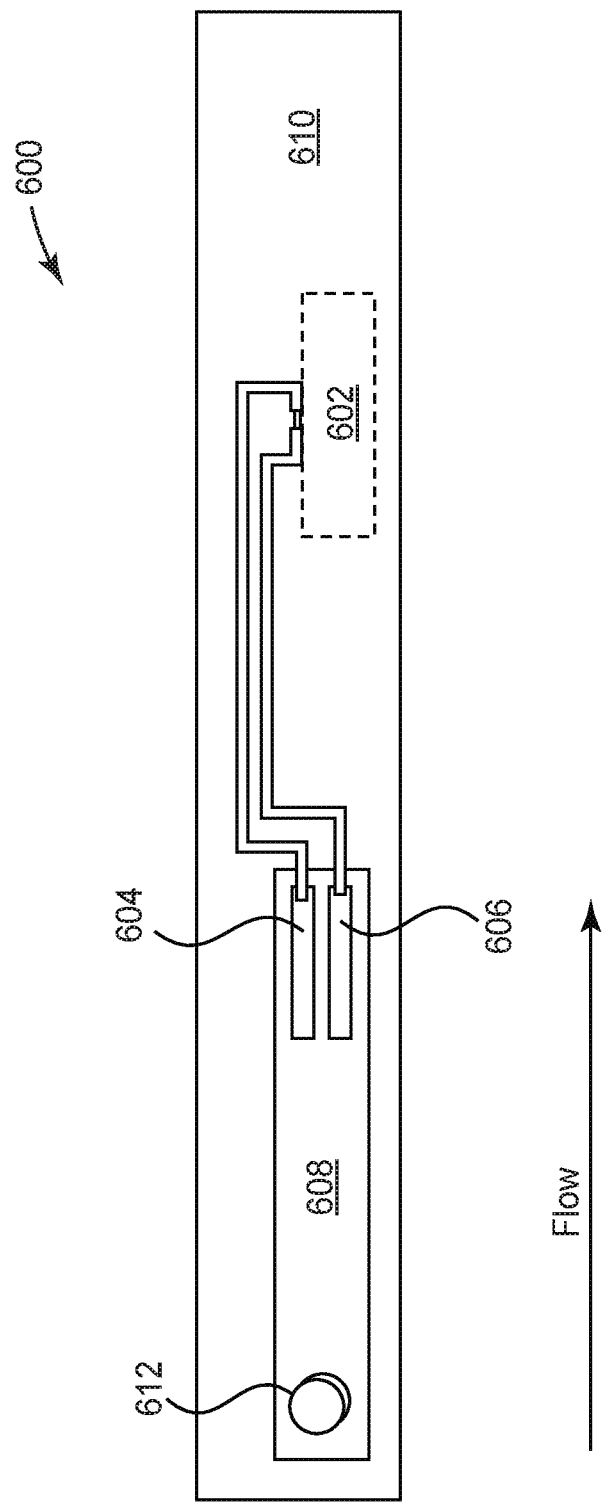
FIG. 6 illustrates a sterilization indicator sensor 600 in accordance with one embodiment.

FIG. 6 illustrates sterilization indicator sensor 600 which is an embodiment of sterilization indicator sensor 200 except the first substrate 608 and environmental change receptor 612 form a sterilant-responsive switch to modify the impedance of sensor device 602. The sterilization indicator sensor 600 can include a wicking first substrate 608 that is disposed on or proximate to second substrate 610 (which is preferably non-wicking). The sensor device 602 (e.g., specifically the integrated circuit, while having a separate antenna) can be electrically coupled to first conductive trace 604 and second conductive trace 606 in an open-loop or open-circuit configuration where the first conductive trace 604 and second conductive trace 606 each contact the first substrate 608 but do not contact each other. The sterilization indicator sensor 600 can also include an environmental change receptor 612 disposed on or proximate to the first substrate 608. Embodiments of different sterilant-responsive switches (that do not involve polymeric gate materials) in the sterilization indicator sensor 600 are described in FIGS. 7 to 9.

Figure 7:
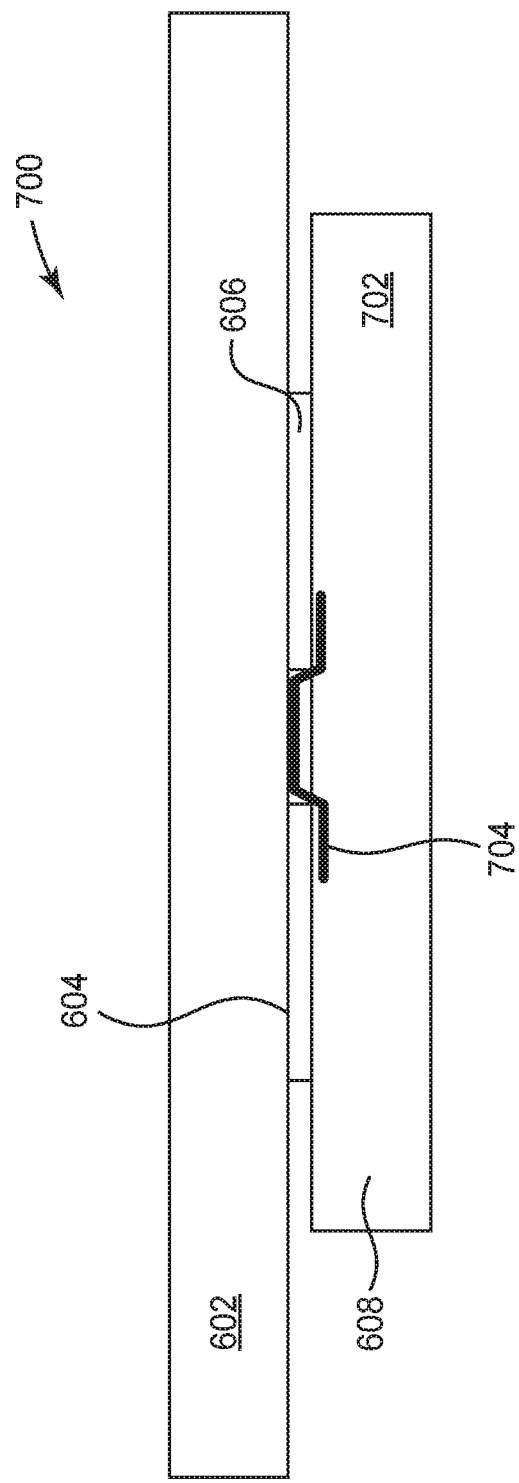
FIG. 7 illustrates a sterilization indicator sensor 700 in accordance with one embodiment.

FIG. 7 illustrates a sterilization indicator sensor 700 which is an embodiment of sterilization indicator sensor 600. The sterilization indicator sensor 700 can use a conductive element 704 to complete the electrical circuit between a first conductive trace 604 and a second conductive trace 606 of a sensor device 602. The conductive element 704 can be arranged as a layer of conductive material. In at least one embodiment, the conductive element 704 can have a thickness of no greater than 100 microns. The conductive element 704 can be applied or printed during assembly of the sensor device 602.

Upon an adequate sterilization process, the environmental change receptor 702 can absorb into the first substrate 608. Preferably, the environmental change receptor 702 can be acidic such that it is capable of dissolving the conductive element 704. Further, the conductive element 704 is acid-dissolvable. The acid in the environmental change receptor 702, after diffusing through the filter paper and into the region between the conductive traces, can dissolve or etch away the conductive element 704 link between the conductive traces.

Figure 8:
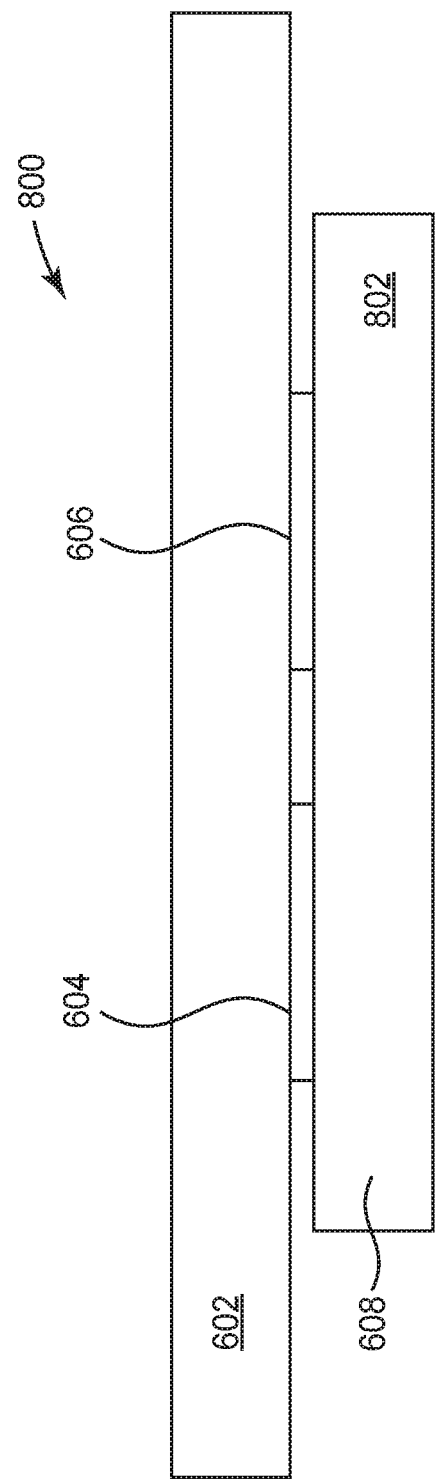
FIG. 8 illustrates a sterilization indicator sensor 800 in accordance with one embodiment.

FIG. 8 illustrates a sterilization indicator sensor 800 which is an embodiment of sterilization indicator sensor 600. The sterilization indicator sensor 800 can use an electrically conductive solution 802 to complete the circuit between a first conductive trace 604 and a second conductive trace 606 in a sensor device 602. In at least one embodiment, the electrically conductive solution 802 can be derived from the interaction between an environmental change receptor and the environmental condition (e.g., steam). For example, the environmental change receptor can itself be conductive via metal particles or conduct in the presence of water (such as an ionic salt).

In at least one embodiment, the conductive traces 604, 606 are sandwiched between the sensor device 602 and first substrate 608 such that when the electrically conductive solution 802 diffuses through the first substrate 608 into the region between the conductive traces, the loop can become electrically closed. When the sensor device 602 is interrogated by the reader, the sensor device 602 answers with a code indicating either "loop open", meaning that the electrically conductive solution 802 has not arrived between the contacts or "loop closed", meaning that, after melting, a short circuit has been provided between first conductive trace 604 and second conductive trace 606.

FIG. 9 illustrates a sterilization indicator sensor 900 that is similar to sterilization indicator sensor 800 except sterilization indicator sensor 900 includes conductive element 904 disposed on the first substrate 608 on a side opposite a side contacting the first conductive trace 604 and second conductive trace 606.

The first substrate 608 can have a low relative dielectric constant (e.g., less than 5). Once exposed to an adequate sterilization process, the first substrate 608 infused with electrically conductive solution 902 (from an environmental change receptor interacting with the environmental condition) can have a relative dielectric constant increased to values of 50 or more. For example, the environmental change receptor can be salicylamide. In at least one embodiment, the capacitance of the monitoring loop can be increased, but the monitoring loop can be non-conductive. Thus, combined with the conductive element 904, a monitoring loop of the sensor device 602 can be completed. In at least one embodiment, the conductive element 904 can function to shield the electrically conductive solution 902 from interrogation such that the dielectric constant can be sensed by the sterilization indication sensor 900.

FIGS. 10A-C illustrate a sterilization indicator sensor 1000. The sterilization indicator sensor 1000 can change based on the folding and unfolding of the RFID tag 1002 (e.g., the antenna) in response to an adhesive 1006 failure. The RFID tag 1002 can be divided into section 1016 and section 1018 based on fold line 1014. The fold line 1014 can be an axis that changes the impedance when the RFID tag 1002 is folded. In at least one embodiment, the fold line 1014 is proximate a central axis of symmetry so that the two ends of the RFID tag 1002 touch or are very close to touching when they overlap. Without being bound by any theory, it is understood that folding along the symmetrical axis causes the antenna to shield itself. It is important to note that the antenna can still be read at a significant range if simply folded less tightly, leaving around 0.1 inches or more of an air gap 1015 so that the ends of the antenna are not close to touching when folded.

As shown, the RFID tag 1002 is oriented width-wise with the fold line 1014 dividing the RFID tag 1002 into two approximately equal widths. As shown, the fold line 1014 can be proximate an axis of symmetry. However, various RFID tags may be structured differently.

The sterilization indicator sensor 1000 can include a first substrate 1004. First substrate 1004 is preferably wicking. Each surface of the first substrate 1004 has an adhesive disposed thereon. For example, adhesive 1006 is disposed on a first surface and adhesive 1008 is disposed on a second surface of the first substrate 1004. In at least one embodiment, the first substrate 1004 can have a longitudinal dimension that is oriented such that the environmental change receptor 1010 does not contact the RFID tag 1002 when folded. Thus, the first substrate position 1020 and the environmental change receptor 1010 is positioned outside of a perimeter of the RFID tag 1002 in either the folded or unfolded state. In at least one embodiment, both the adhesive 1006 and environmental change receptor 1010 are selected so that the environmental change receptor 1010 can degrade the adhesive bond with the first substrate 1004.

In at least one embodiment, the adhesive 1006 or 1008 is designed to fail at environmental conditions corresponding to an adequate sterilization process.

FIG. 10B illustrates the folded state. In the folded state, the RFID tag 1002 sandwiches the adhesive layers which in turn sandwich first substrate 1004. Once exposed to an adequate sterilization process, the environmental change receptor 1010 can melt into the first substrate 1004 to form modified first substrate 1012 and be transported from a first substrate position 1020 to a second substrate position 1022 based on the environmental condition. Upon reaching the second substrate position 1022, the environmental change receptor 1010 can cause the adhesive 1006 or adhesive 1008 to release into an unfolded state in FIG. 10C.

The degree of the unfolded state of the RFID tag 1002 can affect the read range. An RFID tag 1002 that is creased less aggressively at its fold line 1014 could open up completely after the adhesive 1006 releases from the paper and would have a slightly larger read range than an RFID tag 1002 that doesn't open completely. However, completely opening the RFID tag 1002 can require significantly more space than leaving the RFID tag 1002 still largely folded but gapped.

In at least one embodiment, the antenna is only deactivated if the symmetric sides of the antenna overlap when folded. Folding along other axes will not kill the antenna as efficiently and folding a plurality of fold lines along a plurality of axes could change the resulting impedance of each fold line as each section opens which would allow for granular RFID tag measurements.

Figure 11A:
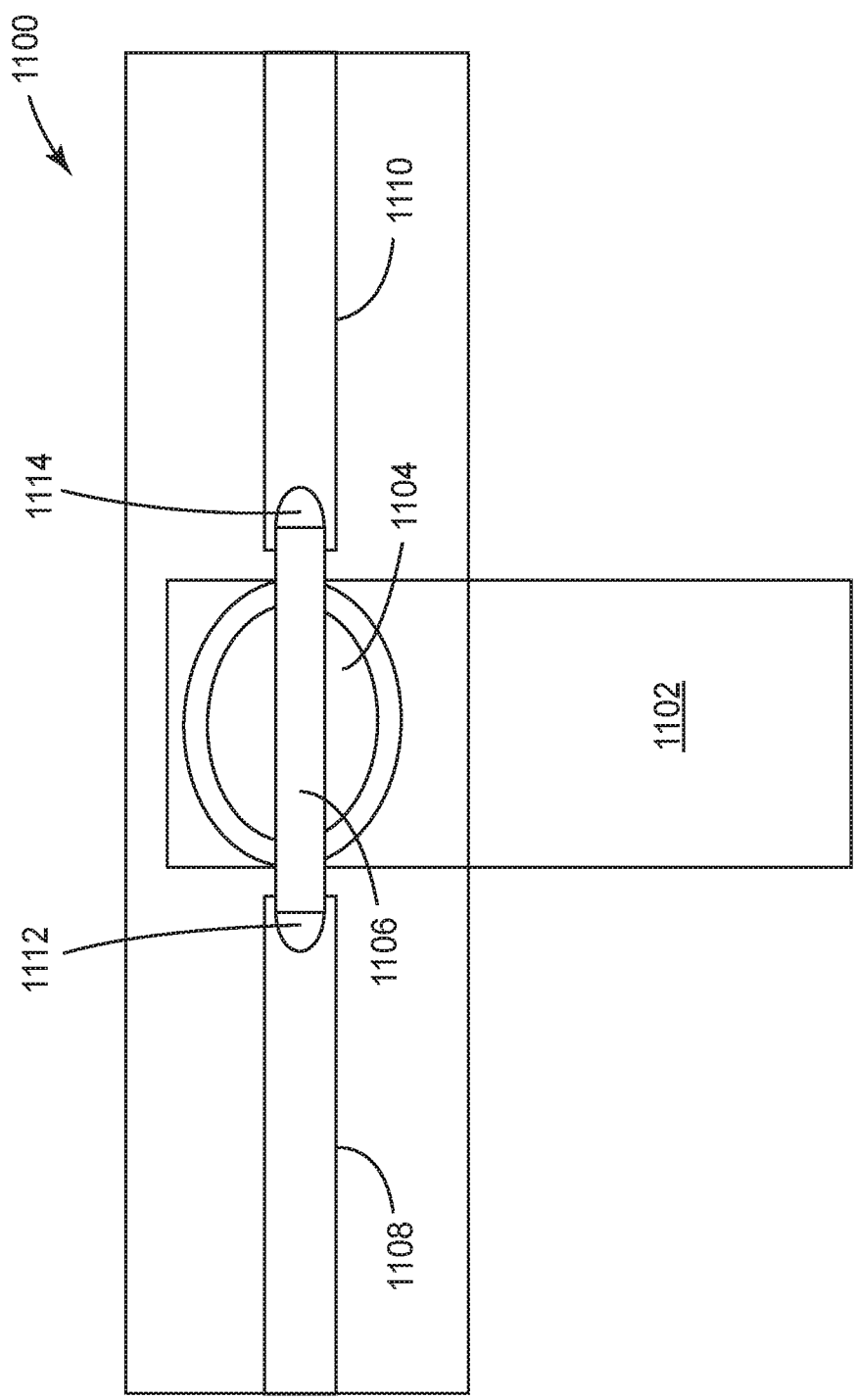
FIG. 11A illustrates an elevational view of a sterilization indicator sensor 1100 in accordance with one embodiment.

FIGS. 11A-C illustrate a sterilization indicator sensor 1100. The sterilization indicator sensor 1100 can use a melting environmental change receptor 1104 to change a position of a conductive element 1106 vertically to complete an electrical circuit between a first conductive trace 1108 and a second conductive trace 1110 of a sensor device.

The sterilization indicator sensor 1100 can have a first substrate 1102 disposed between the first conductive trace 1108 and second conductive trace 1110. The first conductive trace 1108 can have a solder 1112 disposed thereon and the second conductive trace 1110 can have a solder 1114 disposed thereon. The solder can act as a spacer having a height that corresponds to a predicted degradation of the environmental change receptor 1104 in response to environmental conditions of an adequate sterilization process.

In at least one embodiment, each end of a conductive element 1106 can align with the solder 1112 and solder 1114. In at least one embodiment, the width dimension of the conductive element 1106 can be greater than the distance between solder 1112 and solder 1114. For example, the conductive element 1106 can be less than 1 thousandth of an inch in average thickness and have a width of 300 thousandths of an inch and a length of 100 thousandths of an inch. As shown, the conductive element 1106 can be any conductive material such as copper metal.

The environmental change receptor 1104 can preferably be solid and be dissolvable by the sterilant or meltable based on the environmental conditions. An example of environmental change receptor 1104 is salicylamide.

As the sterilization indicator sensor 1100 is exposed to the environmental condition corresponding to an adequate sterilization process (as shown from FIG. 11B to 11C), the environmental change receptor 1104 can physically deform and be wicked into the first substrate 1102 (thus forming modified first substrate 1116). The conductive element 1106 that was previously supported by the environmental change receptor 1104 can be lowered into contact with the solder 1112 and solder 1114. The conductive element 1106 can float on melted environmental change receptor 1104 due to surface tension of environmental change receptor 1104. In at least one embodiment, small pieces of closed cell foams (preferably urethanes/silicones for high temperatures) could be used to float a conductor atop the melted acid.

Figure 12A:
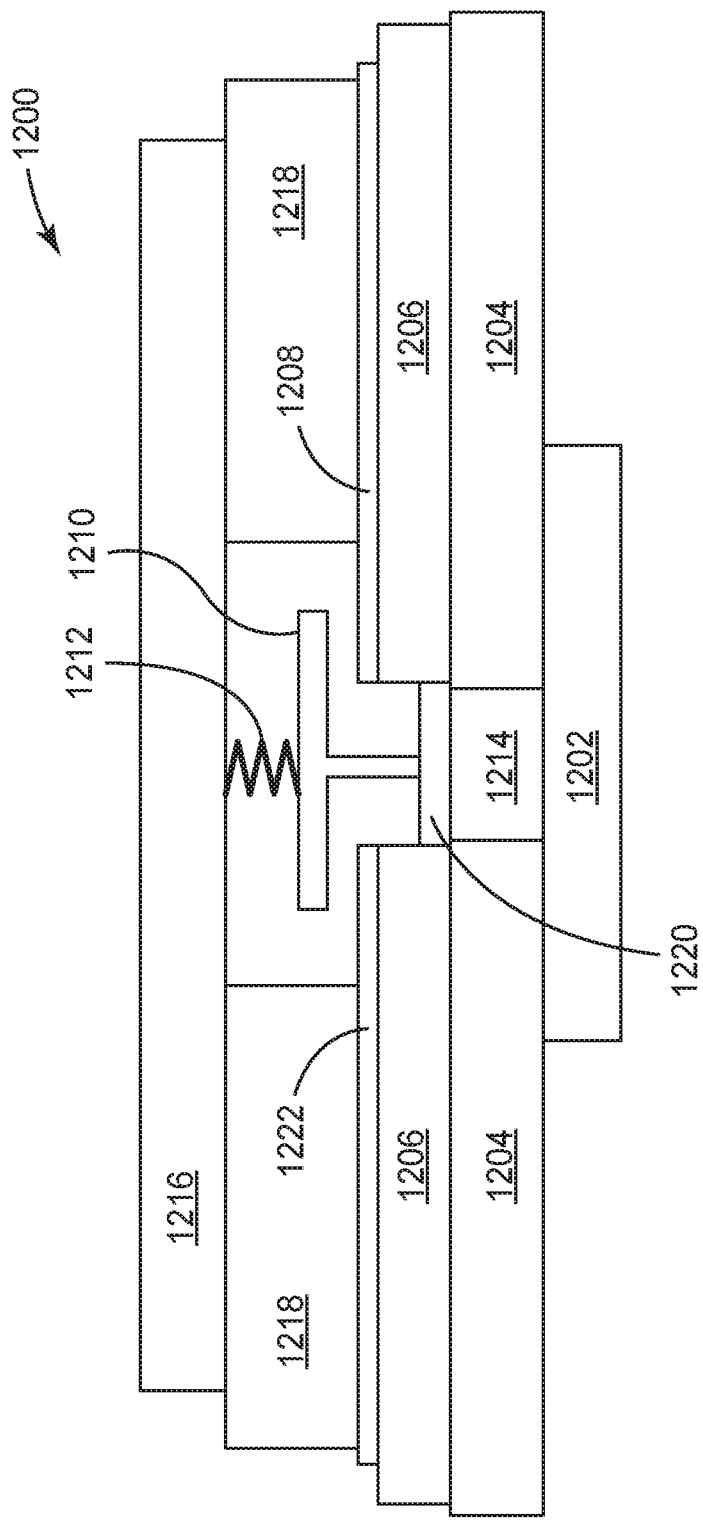
FIG. 12A illustrates a cross-sectional view of a sterilization indicator sensor 1200 in a second impedance state in accordance with one embodiment.
Figure 12B:
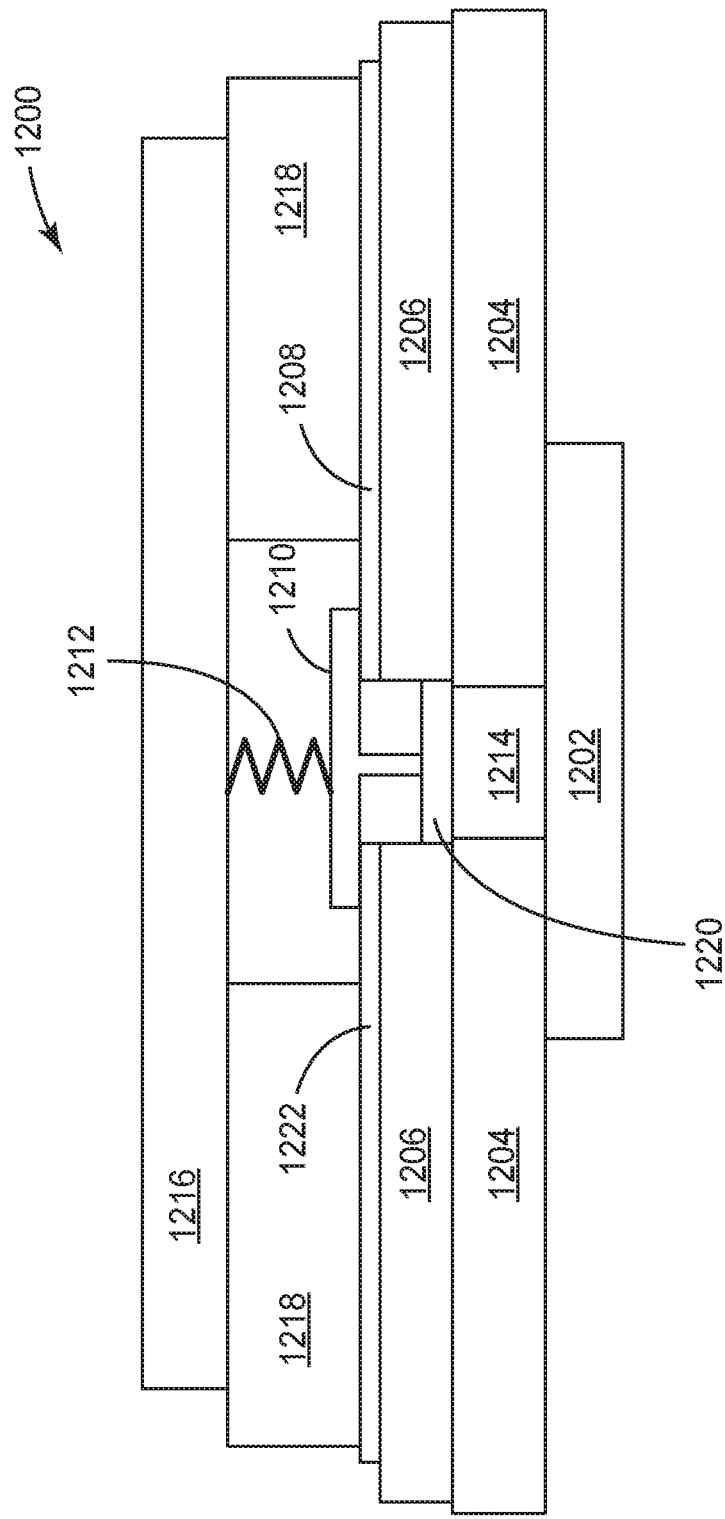
FIG. 12B illustrates a cross-sectional view of a sterilization indicator sensor 1200 in a first impedance state in accordance with one embodiment.

FIGS. 12A-B illustrate a sterilization indicator sensor 1200 that is similar in concept to sterilization indicator sensor 1100 except mechanically assisted in a downward direction by a biasing element (e.g., spring 1212).

The sterilization indicator sensor 1200 can include a first substrate 1202 with an environmental change receptor 1214 disposed thereon. The sterilization indicator sensor 1200 can also include a second substrate 1204 that is sufficiently rigid to prevent the environmental change receptor 1214 from sliding laterally. Exemplary materials can have a shore D hardness of no greater than 85 and can be formed from various polymers.

The sensor device 1206 can be disposed on top of the second substrate 1204 such that the sensor device 1206 is supported by the second substrate 1204. In at least one embodiment, the sensor device 1206 can have a monitoring loop with an open circuit portion that is formed from first conductive trace 1208 and second conductive trace 1222.

In at least one embodiment, an adhesive 1218 can attach a portion of the sensor device 1206 to a cover substrate 1216. In at least one embodiment, both cover substrate 1216 and second substrate 1204 are formed from the same material, e.g., a sufficiently rigid polymer such as polycarbonate. The sterilization indicator sensor 1200 can have a spring 1212 attached to the cover substrate 1216 on one end and attached to a floating conductive element 1210 on another end. In at least one embodiment, the conductive element 1210 can also be mechanically coupled to a plunger 1220 which aligns the force of the spring 1212 such that only a vertical movement is permitted by sterilization indicator sensor 1200.

In at least one embodiment, the spring 1212 is compressed when the environmental change receptor 1214 is not exposed to an environmental condition that corresponds to an adequate sterilization process. The spring 1212 is relaxed when environmental change receptor 1214 is exposed to the environmental condition. For example, upon exposure to the environmental condition, the environmental change receptor 1214 can be wicked into the first substrate 1202. The plunger 1220 can apply a vertical force to further assist the capillary action of the environmental change receptor 1214. The spring 1212 can further drive the conductive element 1210 to electrically couple both the first conductive trace 1208 and second conductive trace 1222.

Figure 13:
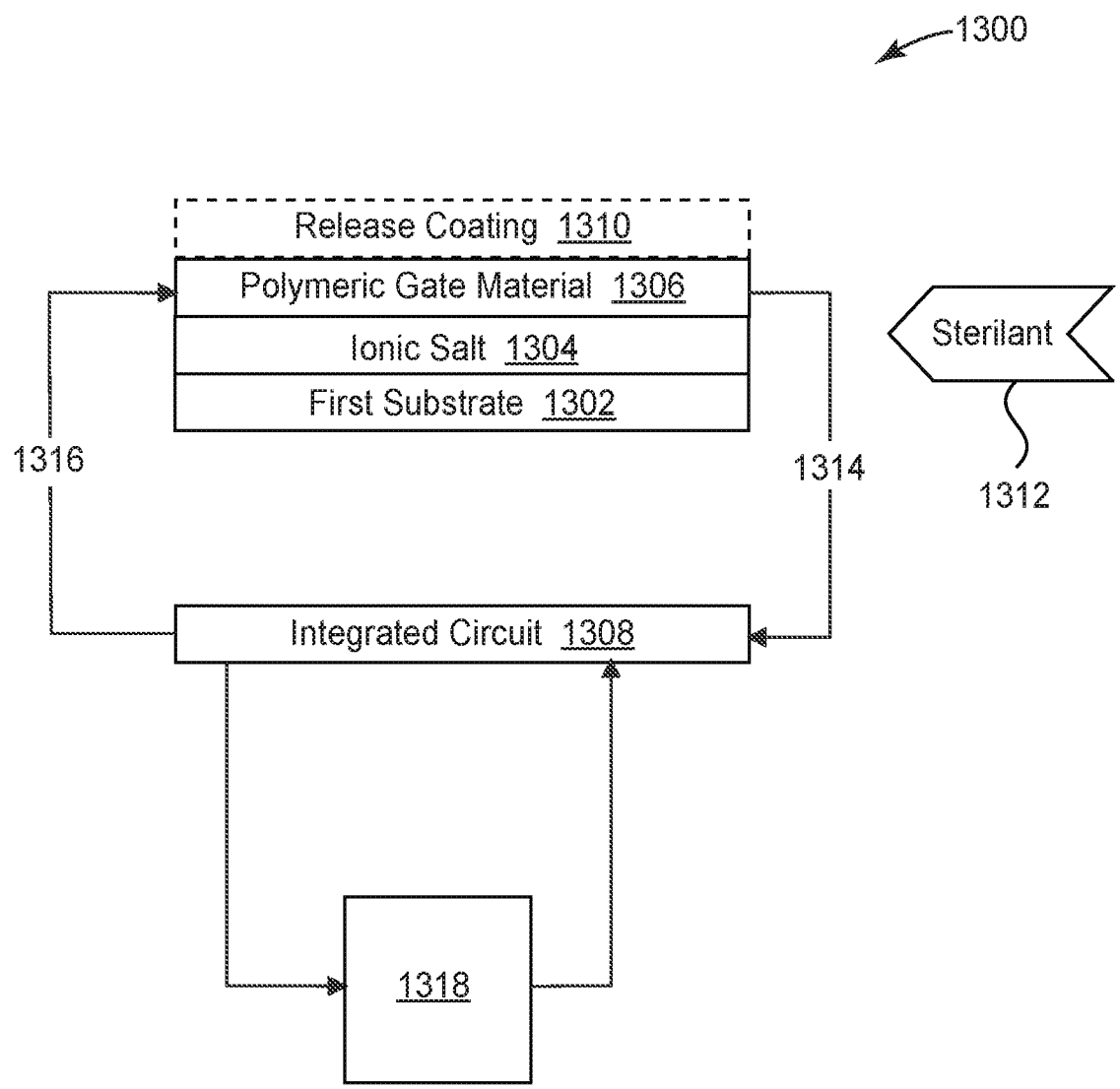
FIG. 13 illustrates a cross-sectional view of a sterilization indicator sensor 1300 in accordance with one embodiment.

FIG. 13 illustrates a sterilization indicator sensor 1300 that is an embodiment of sterilization indicator sensor 200. The sterilization indicator sensor 1300 can be responsive to sterilant 1312. The sterilization indicator sensor 1300 can include a first substrate 1302 which can have regions with an ionic salt 1304 disposed on or impregnated within the first substrate 1302.

Preferably, the ionic salt 1304 is selected such that it reacts with the sterilant 1312 and makes the resulting substance basic. Preferably, the ionic salt 1304 can be magnesium chloride, magnesium bromide, or combinations thereof.

Examples of the first substrate 1302 and ionic salt 1304 can be commercially available from 3M (Saint Paul, MN) under the trade designation Comply as a test sheet and may also be wrapped in a Bowie-Dick test pack.

In at least one embodiment, the ionic salt 1304 contacts the polymeric gate material 1306. The polymeric gate material 1306 is described herein but is preferably PANI, particularly the emeraldine salt. The polymeric gate material 1306 can be disposed on the ionic salt 1304 layer. In at least one embodiment, the polymeric gate material 1306 is embedded within the first substrate 1302. The ionic salt 1304 can be impregnated within the first substrate 1302.

As discussed herein, the polymeric gate material 1306 can bridge conductive trace 1316 and conductive trace 1314. In at least one embodiment, the conductive trace 1316 and conductive trace 1314 and polymeric gate material 1306 can be at least partially embedded in the first substrate 1302 and ionic salt 1304 can form a layer over the polymeric gate material 1306. Portions of the polymeric gate material 1306, ionic salt 1304, first substrate 1302, or combinations thereof can be coated with a release coating 1310. The conductive trace 1314 and conductive trace 1316 can further be electrically coupled to an integrated circuit 1308 which forms a separate branch from antenna 1318. As sterilant 1312 contacts the sterilization indicator sensor 1300, the sterilant 1312 can be absorbed by the first substrate 1302 and ionic salt 1304 which can modify the polymeric gate material 1306 causing the polymeric gate material 1306 to have a second impedance state (e.g., converting the emeraldine salt to an emeraldine base. Further, the ionic salt 1304 can also produce a visual change for later analysis.

In at least one embodiment, if the sterilant 1312 is steam or hydrogen peroxide, then and the conductive trace 1314 and conductive trace 1316 have exposed aluminum, then a redox reaction can occur which changes the emeraldine salt to a leuco emeraldine salt and go from a first impedance state to a second impedance state. Thus, the ionic salt 1304 can be optional.

Figure 14:
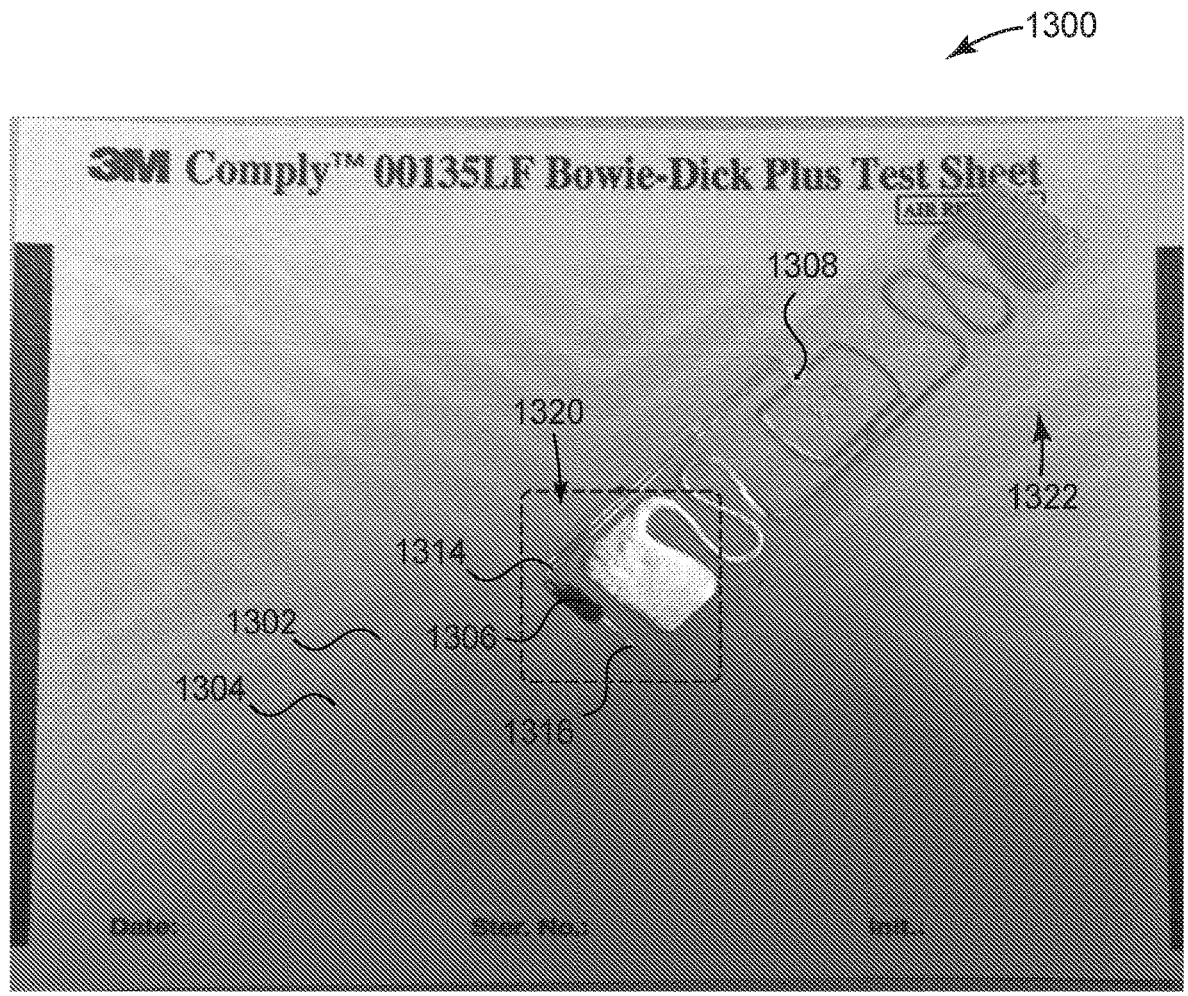
FIG. 14 illustrates an elevational view of a sterilization indicator sensor 1300 in accordance with one embodiment.

FIG. 14 illustrates a sterilization indicator sensor 1300 at a different view. The conductive trace 1314 and conductive trace 1316 are shown contacting the polymeric gate material 1306. Once exposed to a sterilant, the polymeric gate material 1306 can change admittance/impedance which is sensed by an RFID interrogator device.

In at least one embodiment, the sterilization indicator sensor 1300 can be present in a stack of cards which can generally be paper or formed from the first substrate. The sterilization indicator sensor 1300 can be structurally similar to the chemical indicator described in U.S. Pat. No. 9,170,245 which is incorporated by reference. In at least one embodiment, the stack of cards can have the sterilization indicator sensor 1300 positioned medially in the stack of cards.

In at least one embodiment, the sterilization indicator sensor 1300 can form a central zone 1320 and a peripheral zone 1322. Peripheral zone 1322 can surround a central zone 1320. In at least one embodiment, the central zone 1320 can have only partial contact with the sterilant occurred when placed in the stack of cards. The central zone 1320 can be a result of an air pocket formed by the stack of cards with sterilization indicator sensor 1300. In at least one embodiment, the central zone can mirror the shape of the sterilization indicator sensor 1300. For example, the central zone 1320 can be a rectangular (such as a rhomboid), or elliptical shape. In one example, the sterilization indicator sensor 1300 has an area of no greater than 25 square inches and a central zone 1320 of no greater than 1 square inch. Thus, the ratio of overall area to the central zone area can be no greater than 25:1.

In at least one embodiment, the air pocket can be representative of a challenge path that is sterilized last. In at least one embodiment, the polymeric gate material 1306 is positioned in the geometric center of the first substrate 1302 and/or the central zone such that the polymeric gate material 1306 detects whether an adequate environmental condition occurs in the central zone. For example, sterilant can interact with the peripheral zone 1322 but may take time to interact with the central zone 1322 when packaged in the stack of cards. As shown, the polymeric gate material 1306 contacts the ionic salt 1304.

In at least one embodiment, the stack can be completely wrapped in a sheet of material to form a wrapped package. For example, the sheet of material can be a nonwoven that can be a sterilant-permeable medical wrapping commercially available as a sterilization wrap.

Figure 15:
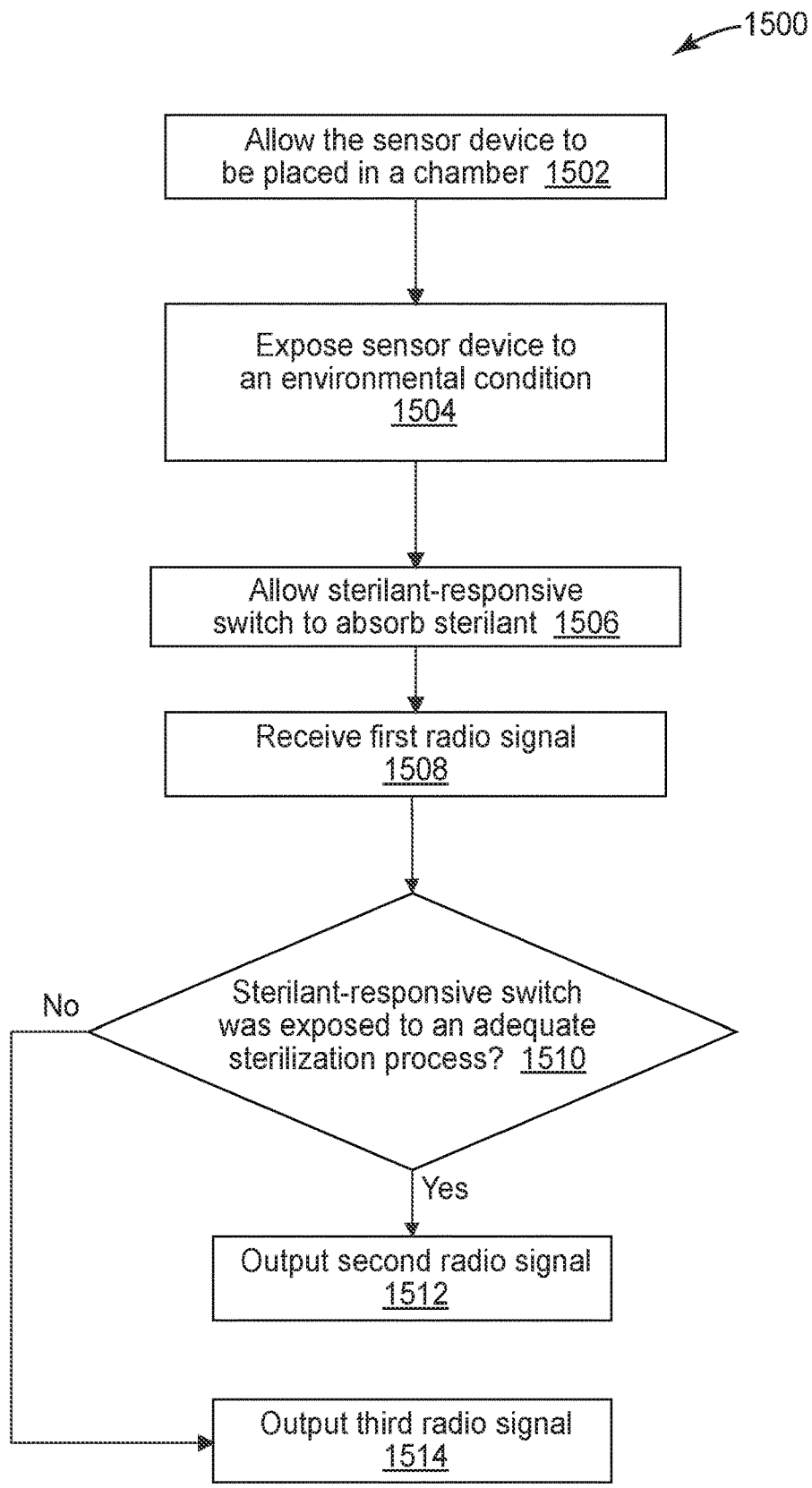
FIG. 15 illustrates a method 1500 in accordance with one embodiment.

FIG. 15 illustrates a method 1500 of using the sensor device.

The method 1500 can begin at block 1502. In block 1502, a user can place the sensor device in the chamber of a sterilizer. In at least one embodiment, the user can place the sensor device with an article to be sterilized in the chamber. The user can also package the sensor device and the article in a wrapped package such that the sensor device is not visible while the package is wrapped. The sensor device is described further herein and includes a sterilant-responsive switch. In at least one embodiment, the user can place the sensor device can be a part of a sterilization indicator sensor which can be placed in the chamber. After the sensor device is placed in the chamber, then the chamber can be sealed from the environment.

In block 1504, a user can activate a sterilization process of the sterilizer and the sensor device can be exposed to a sterilant and/or one or more environmental conditions in a sterilization process. For example, if the sterilant is steam, then the sterilant is at least 95% steam/water vapor and the sterilization process is 134 degrees Celsius for 2 minutes or 121 degrees Celsius for 10 minutes. In another example, if the sterilant is hydrogen peroxide, then the environmental condition is an atmosphere containing 31% hydrogen peroxide vapor and the sterilization process is 50 degrees C. for 60 minutes. Various standards for each sterilant can exist and may vary based on the manufacturer, article to be sterilized, or combinations thereof. In at least one embodiment, the environmental condition includes the presence of the sterilant.

In block 1506, the sterilant-responsive switch of the sensor device or the sterilization indicator sensor can absorb the sterilant or react (physically or chemically) with the environmental condition (which can include the sterilant). In at least one embodiment, the sterilant-responsive switch can also interact with a substrate or an environmental change receptor to modify the admittance/impedance of the sterilant-responsive switch. For example, the environmental condition, environmental change receptor, or combinations thereof, can cause sterilant-responsive switch to change from a second impedance state to a first impedance state, or vice versa.

In block 1508 through block 1514, a sensing device can be configured to read the sensor device to determine whether the first impedance state is present.

In at least one embodiment, the sensing device is configured to read the sensor device through a wrapped package. The sensing device can also be configured to read the sensor device when the chamber is sealed (i.e., through a housing of the sterilizer). The sensing device can use an onboard memory to later read the sensor device. In at least one embodiment, the sensing device is an RFID interrogator device. The sensing device can be configured to transmit a first radio signal to the sensing device in block 1508. The first radio signal can be a variety of frequencies but is preferably UHF (300 MHz-3000 MHz).

The first radio signal can affect the sensor device and the sensor device can emit a second radio signal or a third radio signal in block 1512, or block 1514. For example, in decision block 1510, if the sterilant-responsive switch was exposed to an adequate sterilization process, then the sensor device can output a second radio signal in block 1512. If the sensor device was not exposed to an adequate sterilization process, then the sensor device can output a third radio signal in block 1514. In at least one embodiment, the output can be inherent and not require any computational resources of the sensor device. In at least one embodiment, the second radio signal can be indicative of whether the sterilant-responsive switch has degraded (e.g., the sterilant cause degradation of the sterilant-responsive switch directly or indirectly). In at least one embodiment, the second radio signal can be indicative of whether the sterilant-responsive switch completed a circuit of a monitoring loop of the sensor device. The third radio signal can be indicative of no degradation or minimal degradation of the sterilant-responsive switch.

The presence of the second or third radio signal can indicate to the sensing device whether the sensor device was exposed to environmental conditions from an adequate sterilization process. The sensing device can further communicate whether the adequate sterilization process was achieved and perform subsequent actions as a result.

Figure 16:
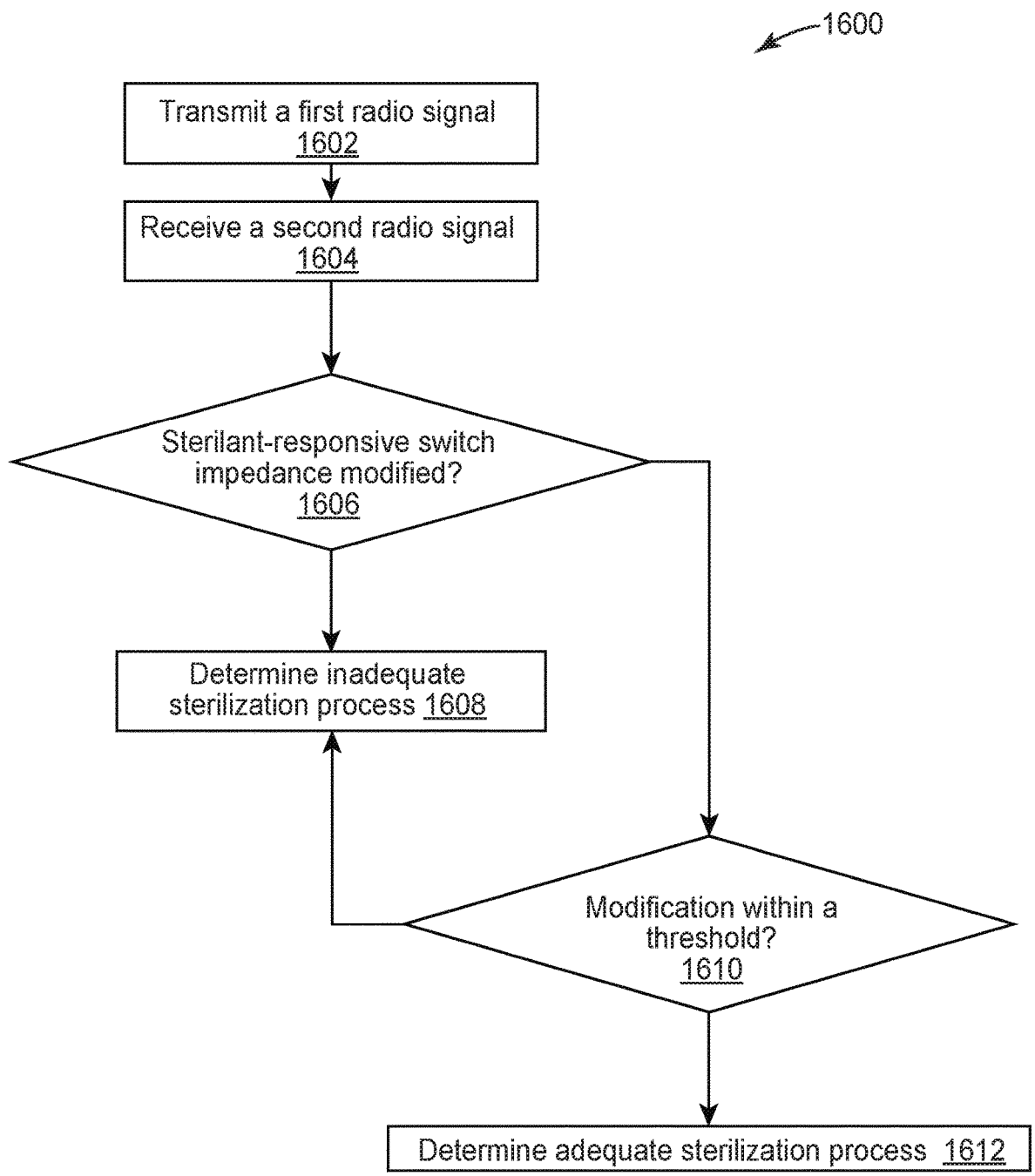
FIG. 16 illustrates a method 1600 in accordance with one embodiment.

FIG. 16 illustrates a flowchart of a method 1600 for interrogating the sensor device. Method 1600 can occur with a sensing device such as an RFID interrogator device. For example, in block 1602, the sensing device transmits a first radio signal. The first radio signal can be at a frequency that causes the antenna of the sensor device to resonate.

In block 1604, the sensing device can receive a second radio signal from the sensor device. In at least one embodiment, the second radio signal can correspond to a different frequency than the first radio signal. In at least one embodiment, the second radio signal can correspond to a different modulation than the modulation of the first radio signal.

In decision block 1606, the sensing device can determine whether the sterilant-responsive switch is modified. For example, the switch can be modified based on degradation of admittance from an expected value for a sterilization process. For example, if there is no degradation in admittance (e.g., meaning higher impedance than expected), then the sensing device can determine that the sensor device was exposed to an inadequate sterilization process. In at least one embodiment, the second radio signal can be indicative of a monitoring loop that has a completed circuit. If the circuit is complete and does not suffer from admittance degradation, then the sensing device can determine that the second radio signal corresponds to an inadequate sterilization process in block 1608.

If there was degradation of admittance from an expected first impedance state, then the sensing device can determine whether the impedance or admittance is within a threshold in decision block 1610. If so, then the sensing device can determine that the sensor device was exposed to an inadequate sterilization process in block 1608.

In at least one embodiment, the sensing device can also provide the graduated impedance readings to a user. For example, the impedance readings can be indicative of various environmental conditions. Each environmental condition can be determined from the impedance of the sensor device and provided to the user.

In at least one embodiment, an additional radio signal at a different frequency from the first radio signal can also be transmitted in response to an inadequate sterilization process. The additional ratio signal can return a fourth radio signal that can be analyzed for environmental conditions.

If the modification of admittance is not within the threshold, then the degradation is too great, and the sensing device can determine that the sensor device was exposed to an adequate sterilization process in block 1612.

Figure 17:
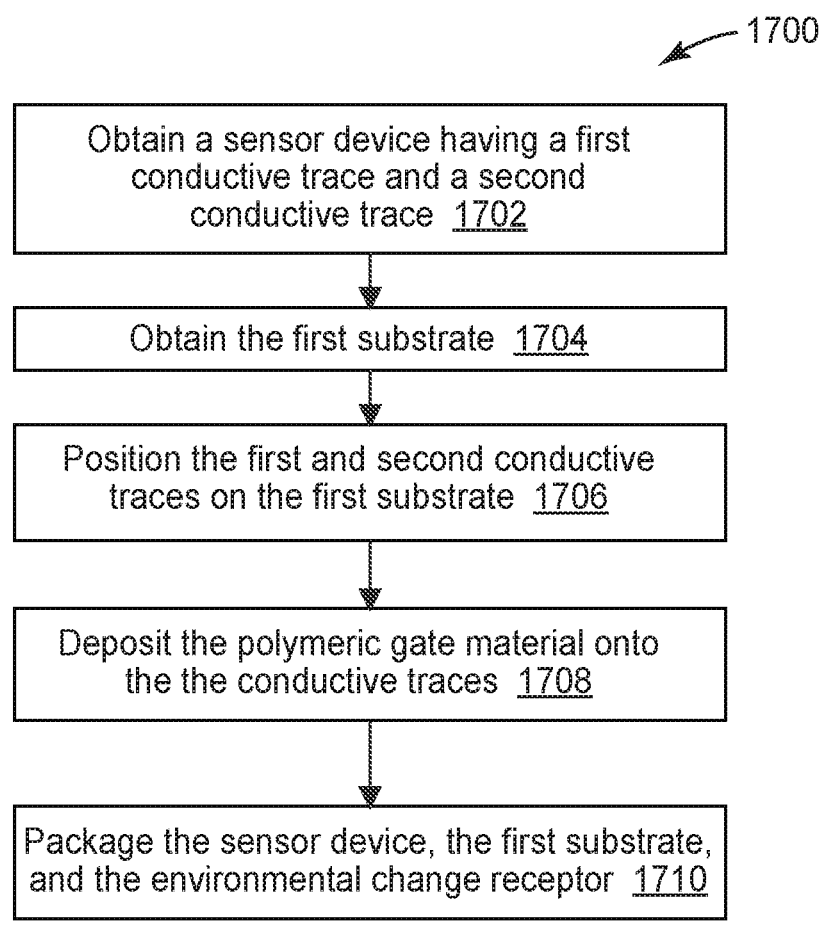
FIG. 17 illustrates a method 1700 in accordance with one embodiment.

FIG. 17 illustrates a flowchart of a method 1700 for manufacturing the sterilization indicator sensor. The method 1700 can begin at block 1702.

In block 1702, sensor device having a first conductive trace and a second conductive trace that are not connected to each other but are connected to an integrated circuit can be acquired. In at least one embodiment, the integrated circuit can be assembled such that integrated circuit can sense that the loop is open or closed. In at least one embodiment, the integrated circuit can interact with the monitoring loop. For example, the first conductive trace and second conductive trace can be both connected to integrated circuit terminals capable of measuring electrical resistance in a binary fashion (on/off) or with further resolution. In at least one embodiment, the electrical state of the monitoring loop 220 can be measured and reported by special circuitry contained within the integrated circuit 206.

In block 1704, the first substrate can also be obtained. As mentioned herein, the first substrate can be wicking or non-wicking.

In block 1706, the first conductive trace and the second conductive trace (i.e., the ends that that are not attached to the integrated circuit) can be positioned on the first substrate. In at least one embodiment, the position can be based on a second substrate position. The first conductive trace and second conductive trace can be inserted into the first substrate or oriented such that both the first conductive trace and second conductive trace are parallel with the surface of the first substrate.

In block 1708, the polymeric gate material can be deposited onto the first conductive trace and the second conductive trace and at least a portion of the first substrate.

In block 1710, the assembly including the sensor device, first substrate can be packaged using a second substrate, and a cover substrate. Further, the package can also include an environmental change receptor.

"Ionic salt" refers to any salt having a cation selected from a group I, group II metal (particularly an alkaline earth metal), or post-transition metal. Preferably, magnesium or bismuth. The anions of an ionic salt can be selected from halogens, oxygen, sulfur, carbonate, borate, titanate, molybdate, phosphate, oxychloride, or combinations thereof.

"Integrated circuit" refers to a component that stores and processes information, in particular, a component that modulates and demodulates radio-frequency (RF) signals "Post-transition metal" refers to post-transition metals are a set of metallic elements in the periodic table located between the transition metals to their left, and the metalloids to their right. As suggested by, Huheey J E, Keiter E A & Keiter R L 1993, Principles of Structure & Reactivity, 4th ed., HarperCollins College Publishers, ISBN 0-06-042995-X, includes Ga, In, Tl, Sn, Pb, Bi, Al, Ge, Sb, Po.

"Second substrate position" refers to a position on the substrate that indicates adequate sterilization. May be established partially by the wicking substrate.

"Conductive element" refers to refers to an ability to conduct an electric current. Electrically conductive materials have an electrical conductivity of at least 2 Siemens per centimeter. Exemplary conductive elements include silver, gold, copper, aluminum, or combinations thereof.

"pH-sensitive polymer" refers to polymer that degrades in pH other than 7. Can be formed from a cationic copolymer based on dimethylaminoethyl methacrylate, butyl methacrylate, and methyl methacrylate.

"Non-metallic" refers to a material other than a metal, or a metal alloy. The term non-metallic also excludes aluminum, tin, zinc, copper, manganese, magnesium, nickel, cobalt, iron, sodium, potassium, lithium, calcium, gallium, cesium, indium and their alloys.

"Monitoring loop" refers to an open or closed electrical loop.

"Adequate sterilization process" refers to a sterilization process that achieves a sterility assurance level of $10^{-6}$, or 12 log reduction of *Bacillus Subtilis* var. *Niger*. The sterility assurance level is related to a probability that a sterilized unit remains nonsterile after undergoing the sterilization process.

"Wicking" refers to any suitable material through which the organic compound can migrate by capillary action. Wicking substances can include paper strips, non-woven polymeric fabrics and inorganic fibrous compositions. Preferred wicking substances are Whatman No. 1 filter paper, Whatman No. 114 filter paper, PET fabric nonwoven, supported microcrystalline cellulose (TLC plate), supported aluminum oxide, and supported silica gel.

"Adequate environmental condition" refers to environmental conditions inside of a sterilization chamber that correspond to the adequate sterilization process.

"Conductive trace" refers to a conductive element forming part of an electrical circuit. Can also be a wire.

The phrase "comprises at least one of" followed by a list refers to comprising any one of the items in the list and any combination of two or more items in the list. The phrase "at least one of" followed by a list refers to any one of the items in the list or any combination of two or more items in the list.

As used herein, the term "or" is generally employed in its usual sense including "and/or" unless the content clearly dictates otherwise.

Although the term "impedance" is used, the term "impedance" is the reciprocal of the "admittance". Depending on the context, either impedance or admittance can be used as changes in the impedance of a material also change the admittance of the material.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

All numerical ranges are inclusive of their endpoints and nonintegral values between the endpoints unless otherwise stated (e.g., 1 to 5 includes 1, 1.5, 2, 2.75, 3, 3.80, 4, 5, etc.).

These and other aspects of the present disclosure will be apparent from the detailed description below. In no event, however, should the above summaries be construed as limitations on the claimed subject matter, which subject matter is defined solely by the attached claims, as may be amended during prosecution.

List of Illustrative Embodiments

1. A sensor device, comprising:
   an integrated circuit;
   a monitoring loop coupled to the integrated circuit comprising:
     a first conductive trace and a second conductive trace, each having a first end electrically coupled to the integrated circuit and a second end;
     a sterilant-responsive switch electrically coupling the second ends of the first conductive trace and the second conductive trace, wherein the sterilant-responsive switch has a first impedance state and a second impedance state, wherein, when the sterilant-responsive switch modifies an electrical connection between the first conductive trace and the second conductive trace based on exposure to an adequate environmental condition in an adequate sterilization process.
2. The sensor device of embodiment 1, wherein the sensor device is an RFID tag, thermometer, pressure sensor device, communication device, or combinations thereof.
3. The sensor device of any of embodiments 1 to 2, wherein the sensor device is an RFID tag, the sensor device further comprises:
   an antenna coupled to the integrated circuit forming an antenna loop distinct from the monitoring loop.
4. The sensor device of embodiment 3, wherein the sensor device is configured to, upon being interrogated by an RFID interrogator device, transmit a first radio signal when the sterilant-responsive switch is exposed to an inadequate sterilization process, and transmit a second radio signal when the sterilant-responsive switch is exposed to an adequate sterilization process.
4a. The sensor device of embodiment 4, wherein the second impedance state is in response to a frequency band from the first radio signal.
5. The sensor device of embodiment 3 or 4, wherein the sterilant-responsive switch is configured to degrade in admittance in response to adequate environmental condition in an adequate sterilization process.

6. The sensor device of any of embodiments 3 to 5, wherein the second radio signal is not null.

7. The sensor device of any of embodiments 1 to 6, wherein the sterilant-responsive switch is a polymeric gate material, the polymeric gate material comprises an electrically active polymer that changes from a first impedance to a second impedance when an environmental change receptor or the sterilant contacts the electrically active polymer.

8. The sensor device of embodiment 7, wherein the electrically active polymer is a semi-flexible rod polymer.

9. The sensor device of embodiment 7 or 8, wherein the electrically active polymer is polyaniline, trans-polyacetylene, poly (p-phenylene), poly(3-vinylperlene), polypyrrole, poly(2,5-bis(3-tetradecylthiophene-2-yl)thieno[3,2-b]thiophene), poly(2-(3-thienyyloxy)ethanesulfonate), polythiophene, or combinations thereof.

10. The sensor device of any of embodiments 7 to 9, wherein the electrically active polymer is un-doped.

11. The sensor device of any of embodiments 7 to 9, wherein the electrically active polymer is doped with a dopant.

12. The sensor device of embodiment 11, wherein the dopant is dinonylnaphthalene sulfonic acid (DNNSA), sodium, arsenic pentafluoride, triiodide, camphorsulfonate, methanesulfonic acid, halogens or polyhalogen ions, methanol, hydrogen sulfate, hydrochloric acid, tetrafluoroborate, sodium sulfite, or combinations thereof.

13. The sensor device of any of embodiments 7 to 12, wherein the first conductive trace and the second conductive trace comprises a post-transition metal disposed thereon or formed therefrom, and the polymeric gate material is disposed on the post-transition metal.

14. The sensor device of any of embodiments 7 to 13, wherein the first conductive trace and the second conductive trace comprises aluminum, upon exposure to an adequate environmental condition comprising a steam sterilant, the aluminum reacts with the electrically active polymer to degrade admittance of the electrically active polymer.

15. The sensor device of any of embodiments 1 to 14, wherein the first impedance state results in a closed monitoring loop.

16. The sensor device of any of embodiments 1 to 15, wherein the second impedance state results in an open monitoring loop.

17. The sensor device of embodiment 16, wherein the second impedance state is non-conductive.

18. The sensor device of any of embodiments 1 to 17, wherein an admittance of the second impedance state is no greater than 90 percent of an admittance of the first impedance state.

19. A sterilization indicator sensor, comprising:
the sensor device of any of embodiment 1 to embodiment 18;
a first substrate, wherein the sterilant-responsive switch contacts the first substrate;
an environmental change receptor that is proximate to the first substrate.

20. The sterilization indicator sensor of embodiment 19, wherein the environmental change receptor produces a visual indication in response to presence of a sterilant.

21. The sterilization indicator sensor of embodiment 19 or 20, wherein the environmental change receptor is non-metallic.

22. The sterilization indicator sensor of any of embodiments 19 to 21, wherein the environmental change receptor comprises an ionic salt.

23. The sterilization indicator sensor of any of embodiments 19 to 22, wherein the environmental change receptor comprises an organic amine or migratable base.

24. The sterilization indicator sensor of any of embodiments 19 to 23, wherein the environmental change receptor is deposited on at least part of a surface of the first substrate and the polymeric gate material contacts the environmental change receptor.

25. The sterilization indicator sensor of any of embodiments 19 to 24, wherein the environmental change receptor is configured to respond to an adequate environmental condition and be transported through the first substrate.

26. The sterilization indicator sensor of any of embodiments 19 to 25, wherein the sterilant comprises steam or water.

27. The sterilization indicator sensor of any of embodiments 19 to 26, further comprising a channel formed between the first substrate and a second substrate.

28. The sterilization indicator sensor of any of embodiments 19 to 27, wherein the first substrate is a wicking substrate configured to wick the sterilant and the environmental change receptor provides a moving front.

29. The sterilization indicator sensor of embodiment 27 or 28, wherein the second substrate is configured to be impermeable to the sterilant.

30. The sterilization indicator sensor of any of embodiments 27 to 29, wherein the sensor device is disposed between the first substrate and the second substrate and spaces apart the first substrate and second substrate to form the channel therein.

31. The sterilization indicator sensor of any of embodiments 27 to 30, wherein the second substrate has a first packaging surface and a second packaging surface, the second packaging surface is partially indented to form a predefined channel.

32. The sterilization indicator sensor of any of embodiments 27 to 31, further comprising adhesive disposed between the second packaging surface and a cover substrate.

33. The sterilization indicator sensor of any of embodiments 19 to 32, wherein the first substrate is configured to wick the sterilant or environmental change receptor from a first substrate position to a second substrate position.

34. The sterilization indicator sensor of embodiment 33, wherein the polymeric gate material is positioned according to the second substrate position.

35. The sterilization indicator sensor of embodiment 33 or 34, wherein the second substrate position corresponds to an adequate environmental condition.

36. The sterilization indicator sensor of any of embodiments 27 to 35, wherein the second substrate comprises a depression formed therein to hold a portion of the environmental change receptor.

37. The sterilization indicator sensor of any of embodiments 19 to 36, wherein the environmental change receptor comprises salicylamide.

38. The sterilization indicator sensor of any of embodiments 19 to 37, wherein the environmental change receptor comprises an organic base having a melting point of greater than 140 degrees C. and miscible with salicylamide.

39. The sterilization indicator sensor of embodiment 38, wherein the organic base is N, N-dimethyl aminopyridine, adamantylamine, or combinations thereof.

40. The sterilization indicator sensor of any of embodiments 19 to 39, wherein the sterilant comprises hydrogen peroxide.

41. The sterilization indicator sensor of any of embodiments 19 to 40, wherein the environmental change receptor comprises a blue colored ink and a pink pigment.

42. The sterilization indicator sensor of any of embodiments 19 to 41, wherein the sterilant-responsive switch comprises a conductive element modifiable by the environmental change receptor based on exposure to the sterilant.

43. The sterilization indicator sensor of embodiment 42, wherein the conductive element is a spring.

44. The sterilization indicator sensor of embodiment 42, wherein the conductive element is a conductive ink.

45. The sterilization indicator sensor of any of embodiments 19 to 44 or the sensor device of any of embodiments 1 to 19, wherein the sterilant-responsive switch comprises an adhesive sandwiching at least two folded sections of a sensor device.

46. The sterilization indicator sensor of any of embodiments 19 to 45, wherein the sterilant-responsive switch comprises a pH-sensitive polymer, a conductive ink layer, and the environmental change receptor is acidic when exposed to the sterilant, wherein the conductive ink layer is electrically coupled between the first conductive trace and the second conductive trace.

47. A sterilization indicator system, comprising:
the sterilization indicator sensor of any of embodiment 19 to embodiment 46;
a sterilizer configured to perform a sterilization process on the sterilization indicator sensor using the sterilant within a chamber.

48. The sterilization indicator system of embodiment 47, further comprising:
an article to be sterilized, wherein the sterilizer is configured to perform a sterilization process on the article.

49. The sterilization indicator system of embodiment 47 or 48, wherein the sterilization indicator sensor provides a visual indication of an adequate environmental condition.

50. The sterilization indicator system of any of embodiments 47 to 49, further comprising:
a wrapped package comprising:
the article;
the sterilization indicator sensor; and
a sheet of material wrapped around both the article and the sterilization indicator system, such that the sheet of material visually obscures the sterilization indicator sensor.

51. The sterilization indicator system of any of embodiments 47 to 50, further comprising:
a sensing device, wherein the sensing device is an RFID interrogator device configured to:
transmit a first radio signal to the sterilization indicator sensor;
receive a second radio signal indicating that the sterilization process is adequate.

52. A method, comprising:
providing a sterilization indicator sensor comprising a sensor device further comprising:
an integrated circuit having a first conductive trace and a second conductive trace;
a sterilant-responsive switch electrically coupling the first conductive trace and the second conductive trace, wherein the sterilant-responsive switch has a first impedance state and a second impedance state, wherein the sterilant-responsive switch modifies an electrical connection between the first conductive trace and the second conductive trace based on exposure to an adequate environmental condition in an adequate sterilization process;
exposing the sensor device to an adequate environmental condition in a sterilization process, wherein the adequate environmental condition comprises a sterilant;
allowing the sterilant-responsive switch to absorb the sterilant which changes the sterilant-responsive switch from a first impedance state to a second impedance state.

53. The method of embodiment 52, wherein the sterilant is at least 95% steam and the adequate sterilizing process is 134 degrees Celsius for 2 minutes or 121 degrees Celsius for 10 minutes.

54. The method of embodiment 53, wherein the first conductive trace and the second conductive trace comprise aluminum on an outer surface, wherein the sterilant-responsive switch comprises emeraldine salt, upon allowing the sterilant-responsive switch to absorb the sterilant comprises, at least a portion of the emeraldine salt is subjected to a redox reaction with aluminum and converts to leucoemeraldine salt.

55. The method of embodiment 52, wherein the sterilant is hydrogen peroxide and an atmosphere of the environmental condition contains 31% hydrogen peroxide vapor and the sterilization process is 50 degrees C. for 60 minutes.

56. The method of any of embodiments 52 to 55, wherein the sensor device is placed in a wrapped package with an article to be sterilized.

57. The method of any of embodiments 52 to 56, wherein the sensor device is a radio frequency identification (RFID) tag.

58. The method of any of embodiments 52 to 57, further comprising receiving a first radio signal from an RFID interrogator device,
wherein, when the sterilant-responsive switch is in the first impedance state, the sensor device outputs a second radio signal; and
when the switch is in the second impedance state, the sensor device outputs a third radio signal.

59. The method of embodiment 58, wherein the first impedance state corresponds to an inadequate sterilization process.

60. The method of embodiment 58 or 59, wherein the second impedance state or second impedance state corresponds to an adequate sterilization process.

61. The method of any of embodiments 52 to 60, further comprising: interrogating the sensor device with the first radio signal and receiving the second radio signal.

62. The method of any of embodiments 52 to 61, wherein the first conductive trace and the second conductive trace are coated with or formed from aluminum.

63. The method of any of embodiments 52 to 62, wherein the sterilant-responsive switch comprises a polymeric gate material.

64. The method of any of embodiments 52 to 63, wherein the sensor device is electrically coupled to a first substrate to form the sterilization indicator sensor;
wherein, upon exposing the sterilization indicator sensor to the sterilization process, the environmental change receptor migrates from a first substrate position to a second substrate position, wherein the sterilant-responsive switch is located at the second substrate position.

65. The method of embodiment 64, wherein, upon exposing the sterilization indicator sensor to an adequate sterilization process, the environmental change receptor visually changes.

What is claimed is:

1. A sterilization indicator sensor, comprising:
a sensor device, comprising:
an integrated circuit;

a monitoring loop coupled to the integrated circuit, the monitoring loop comprising:
   a first conductive trace and a second conductive trace, each having a first end electrically coupled to the integrated circuit and a second end; and
   a sterilant-responsive switch comprising a polymeric gate material, electrically coupling the second end of the first conductive trace and the second end of the second conductive trace, wherein the sterilant-responsive switch has a first impedance state and a second impedance state, wherein the sterilant-responsive switch modifies an electrical connection between the first conductive trace and the second conductive trace based on exposure to an adequate environmental condition in an adequate sterilization process; and
an antenna coupled to the integrated circuit forming an antenna loop, wherein the monitoring loop is distinct from the antenna loop;
a first substrate, wherein the sterilant-responsive switch contacts the first substrate;
an environmental change receptor that is proximate to the first substrate
wherein the sterilant-responsive switch comprises a conductive element modifiable by the environmental change receptor based on exposure to a sterilant.

2. The sterilization indicator sensor of claim 1, wherein the sensor device is an RFID tag, the sensor device is configured to, upon being interrogated by an RFID interrogator device, transmit a first radio signal when the sterilant-responsive switch is exposed to an inadequate sterilization process, and transmit a second radio signal when the sterilant-responsive switch is exposed to the adequate sterilization process.

3. The sterilization indicator sensor of claim 2, wherein the second radio signal is not null.

4. The sterilization indicator sensor of claim 1, wherein the sterilant-responsive switch is configured to degrade in admittance in response to the adequate environmental condition in the adequate sterilization process.

5. The sterilization indicator sensor of claim 1, wherein the sterilant-responsive switch is a polymeric gate material, the polymeric gate material comprises an electrically active polymer that changes from a first impedance to a second impedance when the environmental change receptor or the sterilant contacts the electrically active polymer.

6. The sterilization indicator sensor of claim 5, wherein the electrically active polymer is polyaniline, trans-polyacetylene, poly (p-phenylene), poly(3-vinylperlene), polypyrrole, poly(2,5-bis(3-tetradecylthiophene-2-yl)thieno[3,2-b]thiophene), poly(2-(3-thienyyloxy)ethanesulfonate), polythiophene, or combinations thereof.

7. The sterilization indicator sensor of claim 5, wherein the first conductive trace and the second conductive trace comprises aluminum, upon exposure to the adequate environmental condition comprising a steam sterilant, the aluminum reacts with the electrically active polymer to degrade admittance of the electrically active polymer.

8. The sterilization indicator sensor of claim 1, wherein the environmental change receptor produces a visual indication in response to presence of the sterilant.

9. The sterilization indicator sensor of claim 1, wherein the environmental change receptor is configured to respond to the adequate environmental condition and be transported through the first substrate.

10. The sterilization indicator sensor of claim 1, wherein the first substrate is configured to wick the sterilant or environmental change receptor from a first substrate position to a second substrate position, wherein the polymeric gate material is positioned according to the second substrate position and the second substrate position corresponds to the adequate environmental condition.

11. The sterilization indicator sensor of claim 1, wherein the sterilant-responsive switch comprises a spring and a plunger.

12. The sterilization indicator sensor of claim 1, wherein the conductive element is a conductive ink or a layer thereof.

13. The sterilization indicator sensor of claim 12, wherein the sterilant-responsive switch comprises a pH-sensitive polymer, a conductive ink layer, and the environmental change receptor is acidic when exposed to a sterilant, wherein the conductive ink layer is electrically coupled between the first conductive trace and the second conductive trace.

14. The sterilization indicator sensor of claim 1, wherein the sterilant-responsive switch comprises an adhesive sandwiching at least two folded sections of the sensor device.

15. A sterilization indicator sensor, comprising:
a sensor device, comprising:
   an integrated circuit;
   a monitoring loop coupled to the integrated circuit comprising:
      a first conductive trace and a second conductive trace, each having a first end electrically coupled to the integrated circuit and a second end;
      a sterilant-responsive switch electrically coupling the second end of the first conductive trace and the second end of the second conductive trace, wherein the sterilant-responsive switch has a first impedance state and a second impedance state, wherein the sterilant-responsive switch modifies an electrical connection between the first conductive trace and the second conductive trace based on exposure to an adequate environmental condition in an adequate sterilization process; and
      an antenna coupled to the integrated circuit forming an antenna loop, wherein the monitoring loop is distinct from the antenna loop;
   a first substrate, wherein the sterilant-responsive switch contacts the first substrate; and
   an environmental change receptor that is proximate to the first substrate, wherein the first substrate is configured to wick the sterilant or environmental change receptor from a first substrate position to a second substrate position, wherein a polymeric gate material is positioned according to the second substrate position and the second substrate position corresponds to the adequate environmental condition.

16. A sterilization indicator sensor, comprising:
a sensor device, comprising:
   an integrated circuit;
   a monitoring loop coupled to the integrated circuit comprising:
      a first conductive trace and a second conductive trace, each having a first end electrically coupled to the integrated circuit and a second end;
      a sterilant-responsive switch electrically coupling the second end of the first conductive trace and the second end of the second conductive trace, wherein the sterilant-responsive switch has a first impedance state and a second impedance state, wherein the sterilant-responsive switch modifies an electrical connection between the first conductive trace and the second conductive trace based on exposure to an adequate environmental condition in an adequate sterilization process; and an antenna coupled to the integrated circuit forming an antenna loop, wherein the monitoring loop is distinct from the antenna loop;

a first substrate, wherein the sterilant-responsive switch contacts the first substrate; and an environmental change receptor that is proximate to the first substrate;

wherein the sterilant-responsive switch comprises a conductive element modifiable by the environmental change receptor based on exposure to a sterilant.

17. The sterilization indicator sensor of claim 16, wherein the conductive element is a conductive ink or a layer thereof.

* * * * *